US010517092B1

United States Patent
Weiss et al.

(10) Patent No.: US 10,517,092 B1
(45) Date of Patent: Dec. 24, 2019

(54) WIRELESS MESH DATA NETWORK WITH INCREASED TRANSMISSION CAPACITY

(71) Applicant: SparkMeter, Inc., Washington, DC (US)

(72) Inventors: Jeffrey A. Weiss, Lincoln, RI (US); Maximilian R. F. King, Cambridge, MA (US); Declan Oller, Providence, RI (US); Philip Thomas Zucker, Providence, RI (US); Benjamin Naidich Wiener, Providence, RI (US)

( * ) Notice: Subject to any disclaimer, the term of this patent is extended or adjusted under 35 U.S.C. 154(b) by 0 days.

(21) Appl. No.: 16/429,839

(22) Filed: Jun. 3, 2019

Related U.S. Application Data

(60) Provisional application No. 62/680,506, filed on Jun. 4, 2018, provisional application No. 62/712,523, filed on Jul. 31, 2018.

(51) Int. Cl.
*H04W 72/04* (2009.01)
*H04W 74/06* (2009.01)
*H04W 84/18* (2009.01)

(52) U.S. Cl.
CPC ... *H04W 72/0446* (2013.01); *H04W 72/0466* (2013.01); *H04W 74/06* (2013.01); *H04W 84/18* (2013.01)

(58) Field of Classification Search
CPC ......... H04W 72/0446; H04W 72/0466; H04W 74/06; H04W 84/18
See application file for complete search history.

(56) References Cited

U.S. PATENT DOCUMENTS

| | | | |
|---|---|---|---|
| 7,414,978 | B2 | 8/2008 | Lun et al. |
| 7,706,365 | B2 | 4/2010 | Effros et al. |
| 7,912,003 | B2 | 3/2011 | Radunovic et al. |
| 8,040,836 | B2 | 10/2011 | Wu et al. |
| 8,050,213 | B2 | 11/2011 | Sun et al. |
| 8,081,641 | B2 | 12/2011 | Katabi et al. |
| 8,098,611 | B2 | 1/2012 | Zhang et al. |
| 8,169,885 | B2 | 5/2012 | Li et al. |

(Continued)

FOREIGN PATENT DOCUMENTS

WO 2014/134276 A1 9/2014

OTHER PUBLICATIONS

International Search Report and Written Opinion, dated Aug. 27, 2019, received in international patent application No. PCT/US2019/035209, 13 pages.

*Primary Examiner* — Andrew Lai
*Assistant Examiner* — Harry H Kim
(74) *Attorney, Agent, or Firm* — Verrill; John W. Powell

(57) ABSTRACT

A method for transmitting node data in a wireless meshed network from a plurality of wireless nodes to at least one consolidating node includes assigning each of the plurality of wireless nodes to one of a plurality of node pools and causing each of the plurality of wireless nodes to transmit node data to one or more other wireless nodes and/or the at least one consolidating node during the assigned time slots. Each wireless node transmits its node data during timeslots which are adjacent to timeslots during which a wireless node from another node pool transmits its node data. The node data for each wireless node includes data originating at the wireless node and node data received from another wireless node of the same node pool which are linearly aggregated using network coding.

30 Claims, 15 Drawing Sheets

(56) References Cited

U.S. PATENT DOCUMENTS

| | | |
|---|---|---|
| 8,204,086 B2 | 6/2012 | Luo |
| 8,205,140 B2 | 6/2012 | Hafeez et al. |
| 8,223,728 B2 | 7/2012 | Westphal |
| 8,270,338 B2 | 9/2012 | Chandra |
| 8,306,095 B2 | 11/2012 | Josiam et al. |
| 8,325,754 B2 | 12/2012 | Lee et al. |
| 8,332,713 B2 | 12/2012 | Yang et al. |
| 8,351,871 B2 | 1/2013 | Liu et al. |
| 8,358,608 B2 | 1/2013 | Josiam et al. |
| 8,379,741 B2 | 2/2013 | Choi |
| 8,392,344 B2 | 3/2013 | Bartholomay |
| 8,428,201 B1* | 4/2013 | McHann, Jr. ........ H03G 3/3089 375/257 |
| 8,472,357 B2 | 6/2013 | Ali et al. |
| 8,503,346 B2 | 8/2013 | Hwang et al. |
| 8,514,790 B2 | 8/2013 | Drewes et al. |
| 8,516,344 B2 | 8/2013 | Kim et al. |
| 8,527,848 B2 | 9/2013 | Kim |
| 8,537,736 B2 | 9/2013 | Wei et al. |
| 8,542,636 B2 | 9/2013 | Qiu et al. |
| 8,553,598 B2 | 10/2013 | Manssour et al. |
| 8,553,792 B2 | 10/2013 | Koike-Akino et al. |
| 8,554,134 B2 | 10/2013 | So |
| 8,576,765 B2 | 11/2013 | Shimada et al. |
| 8,577,285 B2 | 11/2013 | Sun et al. |
| 8,605,750 B2 | 12/2013 | Saito et al. |
| 8,665,866 B2 | 3/2014 | Manssour et al. |
| 8,711,978 B2 | 4/2014 | Kim et al. |
| 8,737,297 B2 | 5/2014 | Reznik et al. |
| 8,750,251 B2 | 6/2014 | Shin et al. |
| 8,787,243 B2 | 7/2014 | Yokomakura et al. |
| 8,804,617 B2 | 8/2014 | Wei |
| 8,842,599 B2 | 9/2014 | Osseiran |
| 8,867,510 B2 | 10/2014 | Seferoglu et al. |
| 8,891,593 B1 | 11/2014 | Fawaz et al. |
| 8,908,624 B2 | 12/2014 | Sfar et al. |
| 8,914,714 B2 | 12/2014 | Otsuki et al. |
| 8,917,666 B2 | 12/2014 | Kim et al. |
| 8,942,257 B2 | 1/2015 | Kim et al. |
| 8,995,501 B2 | 3/2015 | Kim et al. |
| 9,007,986 B2 | 4/2015 | Yuan et al. |
| 9,025,607 B2 | 5/2015 | Zeger et al. |
| 9,036,497 B2 | 5/2015 | Oh et al. |
| 9,036,534 B2 | 5/2015 | Li et al. |
| 9,088,351 B2 | 7/2015 | Liu et al. |
| 9,113,470 B2 | 8/2015 | Summerson et al. |
| 9,118,410 B2 | 8/2015 | Lee et al. |
| 9,155,011 B2 | 10/2015 | Gruber et al. |
| 9,166,734 B2 | 10/2015 | Lin et al. |
| 9,182,473 B2 | 11/2015 | Margalef |
| 9,184,871 B2 | 11/2015 | Kim et al. |
| 9,209,943 B1 | 12/2015 | Firoiu et al. |
| 9,215,082 B2 | 12/2015 | Liu et al. |
| 9,232,433 B2 | 1/2016 | Subramanian et al. |
| 9,237,434 B2 | 1/2016 | Mallik et al. |
| 9,246,842 B2 | 1/2016 | Oyman et al. |
| 9,271,123 B2 | 2/2016 | Medard et al. |
| 9,325,513 B2 | 4/2016 | Liu |
| 9,344,913 B2 | 5/2016 | Guo |
| 9,350,440 B2 | 5/2016 | Jeon et al. |
| 9,392,482 B2 | 7/2016 | Bourdelles et al. |
| 9,444,494 B2 | 9/2016 | Summerson |
| 9,497,780 B2 | 11/2016 | Argyriou et al. |
| 9,509,447 B2 | 11/2016 | Kim et al. |
| 9,525,578 B2 | 12/2016 | Kim et al. |
| 9,559,831 B2 | 1/2017 | Zeger et al. |
| 9,602,246 B2 | 3/2017 | Mendes Alves Da Costa et al. |
| 9,628,225 B2 | 4/2017 | Lim et al. |
| 9,661,515 B2 | 5/2017 | Lord |
| 9,667,382 B2 | 5/2017 | Liew et al. |
| 9,723,643 B2 | 8/2017 | Gattami et al. |
| 9,859,971 B2 | 1/2018 | Lim et al. |
| 9,860,022 B2 | 1/2018 | Krigslund et al. |
| 9,860,028 B2 | 1/2018 | Liu et al. |
| 9,923,714 B2 | 3/2018 | Lima et al. |
| 9,936,052 B2 | 4/2018 | Narasimha et al. |
| 9,942,934 B2 | 4/2018 | Narasimha |
| 9,967,909 B2 | 5/2018 | Narasimha |
| 9,973,970 B2 | 5/2018 | Maric et al. |
| 9,998,406 B2 | 6/2018 | Haeupler et al. |
| 10,004,037 B2 | 6/2018 | Zhao et al. |
| 10,117,132 B2 | 10/2018 | Karabulut et al. |
| 10,149,119 B2 | 12/2018 | Wang et al. |
| 10,165,587 B2 | 12/2018 | Gattami et al. |
| 10,230,650 B2 | 3/2019 | Callard et al. |
| 2005/0288026 A1* | 12/2005 | Byun ................... H04W 36/18 455/442 |
| 2005/0288888 A1* | 12/2005 | Ye .......................... H04W 64/00 702/150 |
| 2007/0184826 A1 | 8/2007 | Park et al. |
| 2008/0117904 A1 | 5/2008 | Radha |
| 2009/0067362 A1* | 3/2009 | Doppler ................ H04L 1/1607 370/315 |
| 2009/0201899 A1* | 8/2009 | Liu ......................... H04L 45/24 370/338 |
| 2009/0252146 A1 | 10/2009 | Luo et al. |
| 2009/0285148 A1* | 11/2009 | Luo .................... H04B 7/15521 370/315 |
| 2009/0323580 A1 | 12/2009 | Xue et al. |
| 2010/0278153 A1 | 11/2010 | Horiuchi et al. |
| 2010/0316097 A1 | 12/2010 | Wang |
| 2011/0026429 A1 | 2/2011 | Slimane et al. |
| 2011/0085585 A1 | 4/2011 | Matsumoto et al. |
| 2011/0134828 A1* | 6/2011 | Osseiran ............ H04B 7/15521 370/315 |
| 2012/0257695 A1 | 10/2012 | Li et al. |
| 2012/0281832 A1 | 11/2012 | Matalgah et al. |
| 2012/0314655 A1 | 12/2012 | Xue et al. |
| 2012/0320821 A1 | 12/2012 | Sun |
| 2013/0058276 A1 | 3/2013 | Somasundaram et al. |
| 2013/0148563 A1 | 6/2013 | Brueck et al. |
| 2013/0229968 A1 | 9/2013 | Zainaldin |
| 2014/0226547 A1 | 8/2014 | Zainaldin |
| 2014/0269485 A1 | 9/2014 | Medard et al. |
| 2015/0195033 A1 | 7/2015 | Maric et al. |
| 2015/0334209 A1 | 11/2015 | Song |
| 2015/0365222 A1* | 12/2015 | Zeger ....................... H04L 5/16 370/294 |
| 2016/0006676 A1 | 1/2016 | Haeupler et al. |
| 2016/0011976 A1 | 1/2016 | Lecler |
| 2016/0026910 A1 | 1/2016 | Ayala et al. |
| 2016/0038166 A1 | 2/2016 | Burkhardt et al. |
| 2016/0056920 A1 | 2/2016 | Summerson et al. |
| 2016/0261331 A1 | 9/2016 | Osseiran et al. |
| 2016/0323892 A1 | 11/2016 | Pradini et al. |
| 2016/0359872 A1* | 12/2016 | Yadav .................... H04L 43/04 |
| 2017/0027010 A1 | 1/2017 | Gattami et al. |
| 2017/0201314 A1 | 7/2017 | Grace |
| 2017/0353698 A1 | 12/2017 | Bai et al. |
| 2018/0007502 A1 | 1/2018 | Coutinho et al. |
| 2018/0139680 A1 | 5/2018 | Hui et al. |
| 2018/0146489 A1 | 5/2018 | Jin et al. |
| 2018/0212671 A1 | 7/2018 | Wu et al. |
| 2018/0212764 A1 | 7/2018 | Shi et al. |
| 2018/0309505 A1 | 10/2018 | Darby, III |
| 2018/0359050 A1 | 12/2018 | Lauridsen et al. |
| 2019/0020572 A1 | 1/2019 | Hu et al. |
| 2019/0041845 A1* | 2/2019 | Cella ..................... H04L 1/0002 |
| 2019/0044837 A1 | 2/2019 | Singh et al. |

\* cited by examiner

Original Network

Augmented Network

Schedule

| Cycle | Node 1 | Node 2 | Node 3 | Node 4 | Node 5 | Node 6 | Node 7 | Node 8 | Aggregation |
|---|---|---|---|---|---|---|---|---|---|
| 1 | 1 | | | | | | 7 | | Node 7 |
| 2 | | | 1,3 | | | | | | |
| 3 | | | | | 1,3,5 | | | | |
| 4 | | 2 | | | | | | 1,3,5,8 | Node 8 |
| 5 | | | | 1,2,4 | | | | | |
| 6 | | | | | | 1,2,3,4,6 | | | |
| 7 | 1 | | | | | | 1,2,3,4,5,6,7 | | Node 7 |
| 8 | | | 1,2,3 | | | | | | |
| 9 | | | | | 1,2,3,4,5 | | | | |
| 10 | | 2 | | | | | | 1,2,3,4,5,6,8 | Node 8 |
| 11 | | | | 1,2,4 | | | | | |
| 12 | | | | | | 1,2,3,4,6 | | | |
| 13 | 1 | | | | | | 1,2,3,4,5,6,7 | | Node 7 |
| 14 | | | 1,2,3 | | | | | | |
| 15 | | | | | 1,2,3,4,5 | | | | |
| 16 | | 2 | | | | | | 1,2,3,4,5,6,8 | Node 8 |
| 17 | | | | 1,2,4 | | | | | |
| 18 | | | | | | 1,2,3,4,6 | | | |
| 19 | 1 | | | | | | 1,2,3,4,5,6,7 | | Node 7 |
| 20 | | | 1,2,3 | | | | | | |
| 21 | | | | | 1,2,3,4,5 | | | | |
| 22 | | 2 | | | | | | 1,2,3,4,5,6,8 | Node 8 |
| 23 | | | | 1,2,4 | | | | | |
| 24 | | | | | | | | | |

FIG. 9

|   | Nodes 1,9 | Nodes 2,13 | Nodes 3,10 | Nodes 4,14 | Nodes 5,11 | Nodes 6,15 | Nodes 7,12 | Nodes 8,16 | Aggregation |
|---|---|---|---|---|---|---|---|---|---|
| 1 | 1 | | 10 | | | | 7 | | Node 7 |
| 2 | | 9 | 1,3 | | | | 12 | | Node 12 |
| 3 | | | | | 1,3,5<br>10,11 | | | | |
| 4 | | 2 | | 9,14 | | | | 1,3,5,8 | Node 8 |
| 5 | | 13 | | 1,2,4 | | | | 10,11,16 | Node 16 |
| 6 | | | | | | 1,2,3,4,6<br>9,10,14,15 | | | |
| 7 | 1 | | 9,10,13 | | | | 1,2,3,4,5,6,7 | | Node 7 |
| 8 | | 9 | 1,2,3 | | | | 9,10,11,12,14 | | Node 12 |
| 9 | | | | | 1,2,3,4,5<br>9,10,11,13,14 | | | | |
| 10 | | 2 | | 9,13,14 | | | | 1,2,3,4,5,6,8 | Node 8 |
| 11 | | 13 | | 1,2,4 | | | | 9,10,11,13,14,15,16 | Node 16 |
| 12 | | | | | | 1,2,3,4,6<br>9,10,13,14,15 | | | |
| 13 | 1 | | 9,10,13 | | | | 1,2,3,4,5,6,7 | | Node 7 |
| 14 | | 9 | 1,2,3 | | | | 9,10,11,12,13,14 | | Node 12 |
| 15 | | | | | 1,2,3,4,5<br>9,10,11,13,14 | | | | |
| 16 | | 2 | | 9,13,14 | | | | 1,2,3,4,5,6,8 | Node 8 |
| 17 | | 13 | | 1,2,4 | | | | 9,10,11,13,14,15,16 | Node 16 |
| 18 | | | | | | 1,2,3,4,6<br>9,10,13,14,15 | | | |
| 19 | 1 | | 9,10,13 | | | | 1,2,3,4,5,6,7 | | Node 7 |
| 20 | | 9 | 1,2,3 | | | | 9,10,11,12,13,14 | | Node 12 |
| 21 | | | | | 1,2,3,4,5<br>9,10,11,13,14 | | | | |
| 22 | | 2 | | 9,13,14 | | | | 1,2,3,4,5,6,8 | Node 8 |
| 23 | | 13 | | 1,2,4 | | | | 9,10,11,13,14,15,16 | Node 16 |
| 24 | | | | | | 1,2,3,4,6<br>9,10,13,14,15 | | | |

FIG. 11

WIRELESS MESH DATA NETWORK WITH INCREASED TRANSMISSION CAPACITY

CROSS-REFERENCE TO RELATED APPLICATIONS

This application claims the benefit of priority to U.S. Provisional Application Ser. No. 62/680,506, filed Jun. 4, 2018, and the benefit of priority to U.S. Provisional Application Ser. No. 62/712,523, filed Jul. 31, 2018, the contents of these applications are hereby incorporated by reference in their entirety.

FIELD OF THE INVENTION

This disclosure relates to wireless mesh data networks and more specifically to such wireless mesh data networks having increased transmission capacity.

BACKGROUND OF THE INVENTION

In wireless mesh data networks, it is frequently necessary for one or more controllers to obtain and consolidate data from active nodes in the network on a regular basis for accounting, control or alarm purposes. In electric meter networks, network wide data acquisition is typically completed every fifteen (15) minutes. For battery powered applications such as the monitoring of residential water meters, the polling interval is more infrequent, for example once per day. Other applications such as monitoring sensors in a building or along a pipeline might require data transfers to occur within a few seconds or a few minutes of an event depending upon the criticality of the event and time sensitivity of the parameters which are being monitored.

Many wireless sensor networks make use of meshed network topologies. This reduces dependence on third party networks such as cellular infrastructure. When cellular, wire or fiber backhaul is required either due to physical typology or overall network size, it is desirable to minimize the number of interfaces which are required to one or more external networks.

Existing meshed networking protocols, such as supported by 802.15.4, rely on route discovery followed by individual node polling by one or more controllers. In large multi-hop networks, even after route discovery has been completed, it can still require a second or more to poll and retrieve data from individual nodes if they are enough hops away from the network controller. Node to node forwarding of individual messages makes inefficient use of the available capacity of the network and therefore restricts the number of nodes which can be polled in a timely fashion sharing a single shared radio channel.

Data collection in meshed wireless networks is generally done using Hop by Hop transport through the network using pre-discovered routes as found by the networking protocol being employed. For example, Zigbee is a common protocol used for energy monitoring applications. In metering implementations, a central hub typically polls individual nodes on a periodic basis for their data. Routing is done using per node routing tables where data is forwarded on an individual packet basis from a node to the requesting hub.

The use of Linear Network Coding in metering applications enables data from multiple devices being polled in a given time interval to aggregate at each node along their path, and to then move in aggregate from the distant edges of a wireless network to one or more controllers. Traffic is highly tolerant to link errors in that if a previously used path is no longer available, as long as one or more alternative nodes can properly receive and aggregate the data they receive with their own data, then all of the data will ultimately reach the designated controller(s).

Linear Network Coding does add new complexities into polled networks. The purpose of this invention is to resolve these complexities for large networks, and also to increase the number of nodes which can be supported in a given time interval. One complication is that the header of each packet must explicitly contain the coefficients for all of the linearly combined source packets it contains. This is necessary so that the original data from any given node can be decoded into its original source form, when done in combination with an appropriate number of linearly independent packets. The controller must not only receive the individual coefficients, but also must be able to uniquely identify the node whose data is multiplied by any given coefficient. Most radio networks have constraints on their maximum allowed packet sizes. For example, 802.15.4 wireless networks only allow up to 127 payload bytes per packet. This limits the number of nodes which can be aggregated together into a single packet.

Therefore, there is a need to overcome the above described limitations of existing network protocols such as Zigbee and Network Coding and enable a wireless mesh network system and protocol which is capable of more rapid polling and retrieval of data even in networks with larger numbers of wireless nodes.

SUMMARY OF INVENTION

In one aspect the invention features a method for transmitting node data in a wireless meshed network from a plurality of wireless nodes to at least one consolidating node, such that the at least one consolidating node periodically receives node data from each of the plurality of wireless nodes. The method includes assigning each of the plurality of wireless nodes to one of a plurality of node pools and causing each of the plurality of wireless nodes to transmit node data to one or more other wireless nodes and/or the at least one consolidating node during assigned time slots. Each wireless node transmits its node data during timeslots which are adjacent to timeslots during which a wireless node from another node pool transmits its node data and the node data for each wireless node includes data originating at the wireless node and node data received from another wireless node of the same node pool. The data originating at the wireless node and the node data received from another wireless node of the same node pool are linearly aggregated using network coding.

In other aspects of the invention one or more of the following features may be included. The consolidating node may be one of a wireless controller or a wireless node assigned to forward node data from a wireless node in another node pool to ultimately be received by a wireless controller. The time slots may be assigned so that the node data transmitted by each wireless node will not interfere with the node data transmitted by any other wireless node in the wireless meshed network. The wireless nodes may be grouped into N hop groups based on their physical distance to the at least one consolidating node. Each of the plurality of node pools may include at least one wireless node in each of the N hop groups. The at least one wireless node in each node pool in a hop group may transmit node data in the same timeslot as a non-interfering wireless node within another node pool. The at least one wireless node in a node pool in a hop group may transmit node data in the same timeslot as a non-interfering wireless node within the same node pool in a different hop group. The node data for each wireless node may further include node data received from a wireless node of a different node pool and the node data received from the wireless node of a different node pool may not be linearly aggregated using network coding with the node data from the same node pool as the receiving wireless node. The node data for each wireless node may further include node data received from a wireless node of said different node pool linearly aggregated with node data received from another wireless node of said different node pool. Each of the plurality of wireless nodes and the wireless controller may include a wireless transceiver. Each of the plurality of wireless nodes may include an electric meter for measuring usage of electricity and the node data transmitted may include an amount of electricity used as measured by the electric meter. The wireless controller may be configured to construct a network map of the plurality wireless nodes and the network map may include for each of the plurality of wireless nodes a network identifier, a hop group identifier indicating the hop group in which the wireless node resides, and the network addresses of the surrounding wireless nodes from which each such wireless node has received node data. The network map may be used to assign each of the plurality of wireless nodes to one of the plurality of node pools. The total number of node pools may be evenly divisible by three.

In another aspect, the invention features a system for transmitting node data in a wireless meshed network. The system includes a plurality of wireless nodes configured to transmit and receive node data and each of the plurality of wireless nodes is assigned to one of a plurality of node pools. There is at least one consolidating node configured to periodically receive node data from each of the plurality of wireless nodes and each of the plurality of wireless nodes is configured to transmit node data to one or more other wireless nodes and/or the at least one consolidating node during assigned time slots. Each wireless node is configured to transmit its node data during timeslots which are adjacent to timeslots during which a wireless node from another node pool transmits its node data. The node data for each wireless node includes data originating at the wireless node and node data received from another wireless node of the same node pool and wherein the data originating at the wireless node and the node data received from another wireless node of the same node pool are linearly aggregated using network coding.

In further aspects of the invention one or more of the following features may be included. The at least one consolidating node may be one of a wireless controller or a wireless node assigned to forward node data from a wireless node in another node pool to ultimately be received by a wireless controller. The time slots may be assigned so that the node data transmitted by each wireless node will not interfere with the node data transmitted by any other wireless node in the wireless meshed network. The plurality of wireless nodes may be grouped into N hop groups based on their physical distance to the at least one consolidating node. Each of the plurality of node pools may include at least one wireless node in each of the N hop groups. The at least one wireless node in each node pool in a hop group may be configured to transmit node data in the same timeslot as a non-interfering wireless node within another node pool in the same hop group. The at least one wireless node in a node pool in a hop group may be configured to transmit node data in the same timeslot as a non-interfering wireless node within the same node pool in a different hop group. The node data for each wireless node may further include node data received from a wireless node of a different node pool and wherein the node data received from the wireless node of a different node pool may not be linearly aggregated using network coding with the node data from the same node pool. The node data for each wireless node may further include node data received from a wireless node of said different node pool the linearly aggregated with node data received from another wireless node of said different node pool. Each of the plurality of wireless nodes and the wireless controller may include a wireless transceiver. Each of the plurality of wireless nodes may include an electric meter for measuring usage of electricity and wherein the node data transmitted may include an amount of electricity used as measured by the electric meter. The wireless controller may be configured to construct a network map of the plurality wireless nodes. The network map may include for each of the plurality of wireless nodes a network identifier, a hop group identifier indicating the hop group in which the wireless node resides, and the network addresses of the surrounding wireless nodes from which each such wireless node has received node data. The network controller may be configured to use the network map to assign each of the plurality of wireless nodes to one of the plurality of node pools. The total number of node pools may be evenly divisible by three.

In yet a further aspect, the invention features a system for transmitting node data in a wireless meshed network, including a plurality of wireless nodes configured to transmit and receive node data. Each of the plurality of wireless nodes is assigned to one of a plurality of node pools and at least one consolidating node is configured to periodically receive node data from the plurality of wireless nodes. Each of the plurality of wireless nodes is configured to transmit node data to one or more other wireless nodes and/or the at least one consolidating node during assigned time slot. The node data for each wireless node includes data originating at the wireless node and node data received from another wireless node of the same node pool and the data originating at the wireless node and the node data received from another wireless node of the same node pool are linearly aggregated using network coding. Each wireless node is configured to transmit node data during its assigned time slots so that the node data transmitted by each wireless node will not interfere with the node data transmitted by any other wireless node in the wireless meshed network.

In an additional aspect, the invention features a system for transmitting node data in a wireless meshed network. The system includes a plurality of wireless nodes configured to transmit and receive node data and each of the plurality of wireless nodes is assigned to one of a plurality of node pools. The wireless nodes in each node pool are configured to transmit node data at a different frequency than the wireless nodes in an adjacent node pool. There is at least one consolidating node configured to periodically receive node data from each of the plurality of wireless nodes and each of the plurality of wireless nodes is configured to transmit node data to one or more other wireless nodes and/or the at least one consolidating node during assigned time slots. Each wireless node is configured to transmit its node data during timeslots which are adjacent to timeslots during which a wireless node from another node pool transmits its node data. The node data for each wireless node includes data originating at the wireless node and node data received from another wireless node of the same node pool and the data originating at the wireless node and the node data received from another wireless node of the same node pool are linearly aggregated using network coding.

BRIEF DESCRIPTION OF THE FIGURES

Embodiments of the present disclosure will now be described, by way of example only, with reference to the attached Figures, wherein:

FIG. 9 is a table depicting the flow of data packets from the wireless nodes of the network topology of FIG. 8.

FIG. 11 is a table depicting the flow of data packets from the wireless nodes of the network topology of FIG. 10.

DETAILED DESCRIPTION OF THE INVENTION

Figure 1:
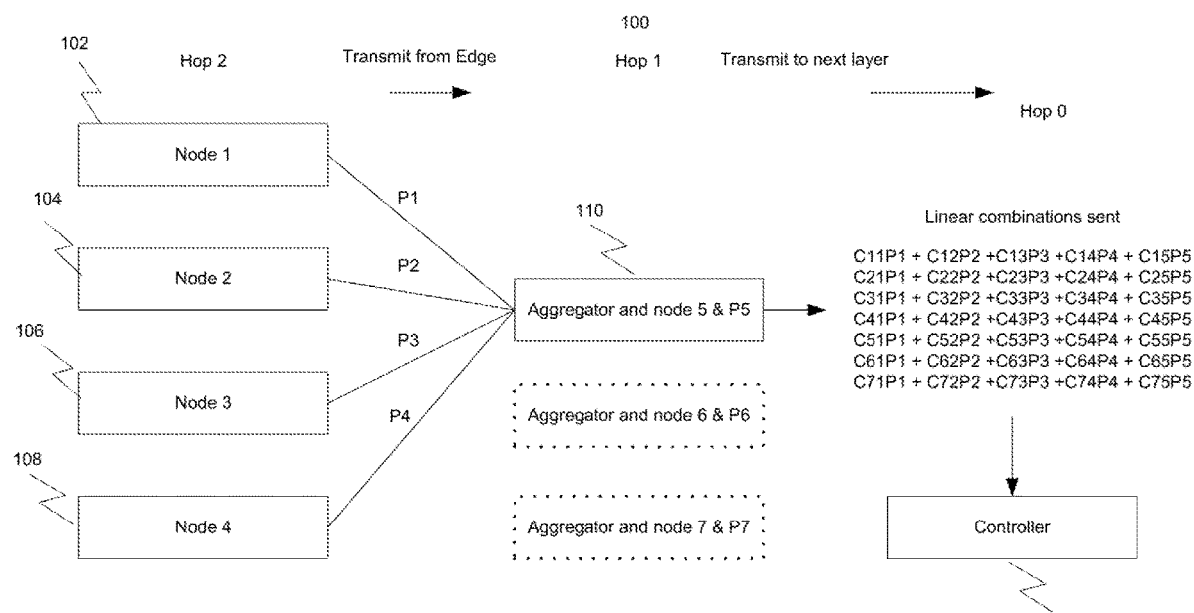
FIG. 1 is a block diagram depicting an existing Network Coding approach for packet aggregation and recovery.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

This disclosure improves the transport capacity of typical meshed data collection networks over conventional hop by hop routing technologies through the use of Network Coding combined with novel time and spatial packet scheduling. The use of Network Coding along with the novel features of this invention improves the reliability of data collection, increases the number of nodes which can be polled in a given time interval, and approaches the theoretical limits of the network's capacity. This disclosure relates more specifically to distributed sensor networks using meshed wireless networks for frequent periodic information gathering from each of the nodes. The wireless mesh provides both redundancy and the ability to capture data at distances too great from one or more controllers to poll directly. Instead, data is routed across multiple hops to its destination.

Linear Network Coding allows traffic (i.e. data packets) from multiple nodes to be aggregated together using either completely random (As in RLNC) or carefully chosen independent coefficients (LNC). Packets are multiplied by these coefficients and the packets are then summed together into multiple linearly independent combinations. At the decoder, each linearly independent packet received is referred to as adding an "additional degree of freedom" for purposes of decoding the data. Using linear algebra, any arbitrary set of received packets which contain at least as many independent linear combinations (or degrees of freedom) as there are reporting nodes is sufficient to recover the original unencoded data. All of the mathematical operations are performed in in a closed finite field (Galois $2^N$).

For example, if data received from five independent nodes is aggregated into seven linearly independent combinations, then any two of the seven packets may be lost on their routes to the network controller. That is, the receipt of any of the five remaining packets is adequate to recover the original data.

For the purpose of this invention, nodes which may be aggregated together are referred to as a "node pool". The maximum node pool size is the (maximum allowed packet length)−(packet header length)−(required poll data field size). For example, if a protocol is constructed on top of 802.15.4, which requires 50 data bytes to be returned per node within each polling interval, and the packet header contains 8 bytes, then 127−50−8=69 bytes are available for network coding coefficients.

For polled networks larger than the number of nodes which may participate in a single coding group, it is advantageous to explicitly subdivide the network into a plurality of pools of nodes, where each pool roughly contains the maximum number of nodes allowed by packet size limitations.

Node pools may be defined by a central wireless controller, and should contain collections of nodes in which each node is proximal to at least one other member of the node pool, but for redundancy preferably more than one other member.

Another complication addressed by this invention is how to optimize traffic from multiple node pools such that one or more wireless controllers may receive polling data every cycle where they are not transmitting polling messages.

A key property of data aggregation as provided by Network Coding is demonstrated in FIG. 1 wherein there is shown a prior art wireless network coding scheme 100 having a total of five wireless nodes and a controller. Wireless nodes 102, 104, 106, and 108, each located in hop group 2, transmit data to wireless node 110, located in hop group 1, which acts as an aggregator. The aggregated data of nodes 1 through 5 are transmitted to wireless controller 112, which is located in hop group 0.

Nodes 102, 104, 106 and 108 deliver equal length data packets to aggregator node 110, which proceeds to form multiple independent linear combinations of the four received packets along with its own data packet. Independent coefficients (C11 ... C75) are used to multiply the data within each packet before summing the modified packets together to form a new packet. The arithmetic operations are over a finite Galois field, typically $2^8$ in size. To enable future decoding, the coefficients used to form the linear combination are bundled into the packet header. In typical applications, the coefficients (C11 ... C75) are randomly selected values, each between 0 and 255.

To solve for the original packets, matrix algebra is used in a closed Galois field. First, Matrix A is constructed by retrieving the coefficient lists from each of the received packets. Then using linear algebra, the inverse of matrix A is formed, $A^{-1}$. In some implementations the matrix inverse is found using Gauss-Jordan elimination, which is a well-known mathematical procedure.

If $Z=(A*M)$ is the matrix of packets received, where Z is a matrix with at least as many independent rows as there are nodes in the network (with data to deliver), and A is the coefficient matrix recovered from the headers of each packet, then M (the set of original data packets P1 through Pn) is found using the matrix equation: $A^{-1}*Z=M$, e.g. $A^{-1}*(A*M)=M$.

Therefore, recovering the original data requires the received coefficient matrix to be inverted followed by multiplication with the received packet matrix Z to obtain the original pre-aggregated packets. As only N linearly independent packets are required to recover the data from N nodes, any additional received packets may be discarded, and represent available redundancy for packet losses while the data traverses a communications network.

Although not exhibited in this example, it is not necessary that every packet processed by the receiver contain a complete linear combination of data from every node. In particular, an arbitrary subset of coefficients in a given packet may be zero (representing data from nodes not yet seen when the packet was constructed for final delivery to the controller). It is also possible to cascade packets along multiple hops and combine new data from these hops into newly constructed packets along the way.

From a fixed set of nodes, the controller's receiver must receive enough packets where each node's data has been included at least once if not multiple times, and with independent degrees of freedom to match the number of nodes which are reporting data.

With network coding, the payload of each packet is fixed in size to allow linear aggregation. For convenience the header may also be fixed in size, allowing each packet to occupy a fixed time interval while being transmitted onto the network. Each of these time intervals may be referred to as a "Time Slot". For a given polling rate, for example, once every 15 minutes, there are a fixed number of available timeslots in which nodes may be scheduled to deliver their data. This is based upon the data rate of the channel, the size of the packets, the overhead for each packet, and the inter-packet gaps required by the receivers to properly synchronize. Each transmission system may have unique values for these parameters.

Figure 2:
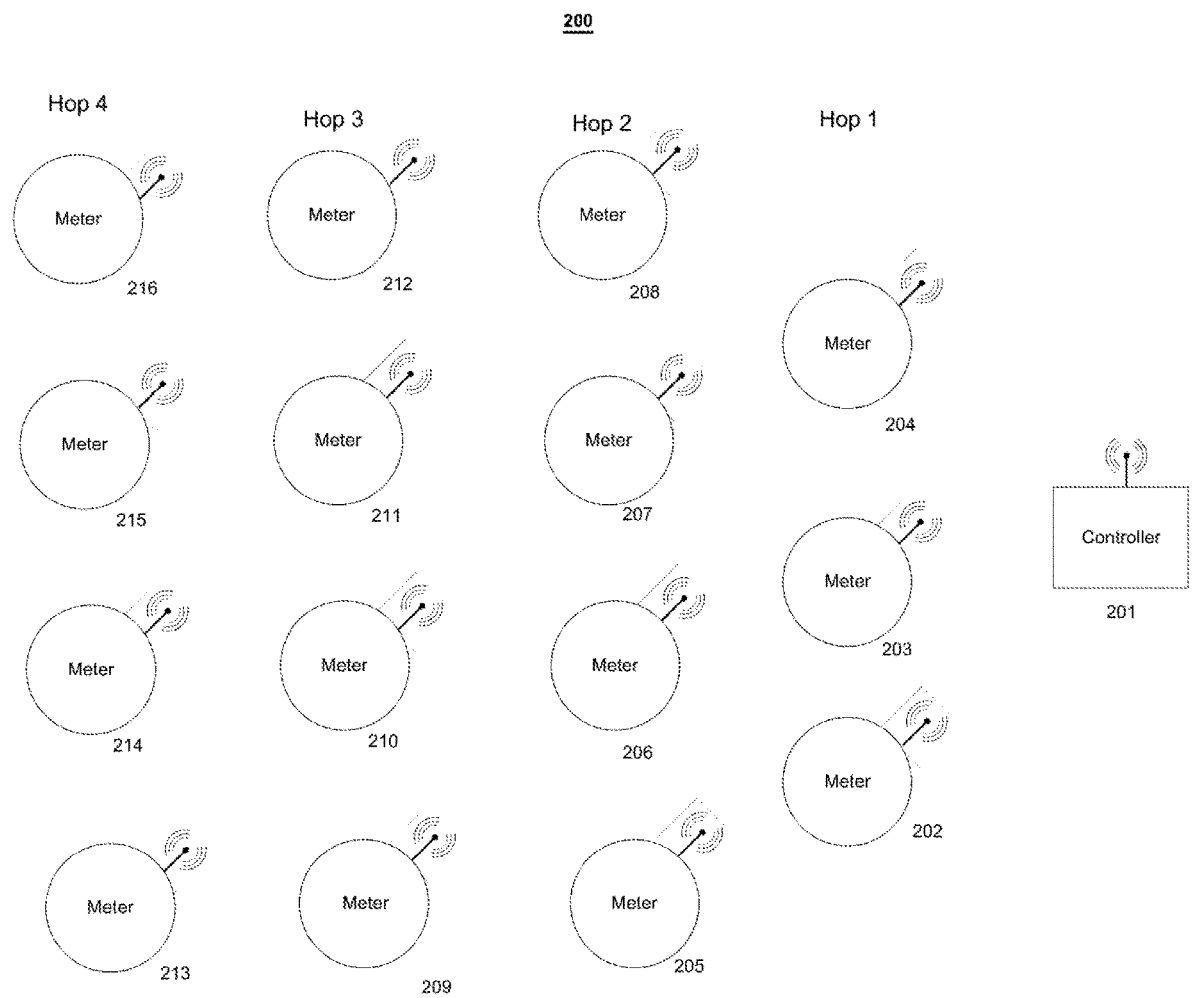
FIG. 2 is a block diagram of a wireless mesh sensor network, which may be configured to operate according to this disclosure.

FIG. 2 shows an exemplary network 200 for collecting data from a plurality of distributed wireless nodes/sensors 202-216 and providing such data to a wireless controller 201, according to an aspect of this disclosure. In this example, the wireless nodes/sensors 202-216 are power meters, which are required to report their data periodically to controller 201. For this application, data may typically be reported at fifteen (15) minute intervals. It should be noted, however, that this disclosure is applicable for any reporting period as well any other wireless network application where nodes are periodically reporting their data to one or more controllers.

Continuing to refer to FIG. 2, wireless network 200 is logically organized into hop groups 1-4, where each hop group represents an additional retransmission required to move data (in the form of data packets) from the left side (i.e. hop group 4) of network 200 to the right side (i.e. hop group 1) of network 200 and, ultimately, to controller 201. For example, packets from meter 216 must hop through at least one "Hop Group 3" meter, one "Hop Group 2" meter and one "Hop group 1" meter to reach controller 201 and report its data for a given time interval. Retransmission from hop group to hop group may be required due to the physical distances separating the wireless nodes/sensors across the wireless network. The wireless meters/sensors are capable of transmitting data no further than one hop group away, i.e. to an adjacent hop group.

Figure 3:
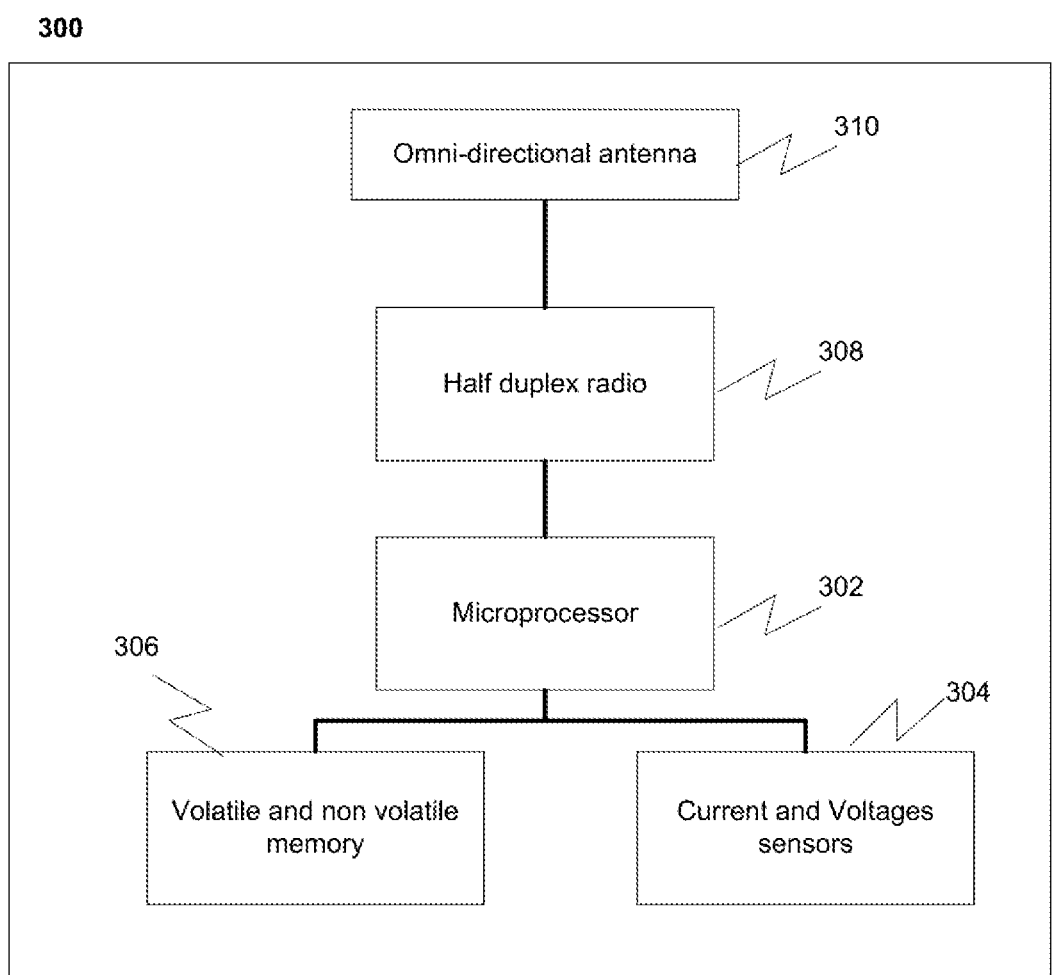
FIG. 3 is a block diagram of an exemplary power meter, which may be configured to operate according to this disclosure.

Wireless meters 202-216 contain wireless transceivers, which may operate according to IEEE 802.15.4 or 802.11 protocol, for example, or nearly any other standards based or proprietary radio protocol. A block diagram of an exemplary wireless meter 300 is shown in FIG. 3 to include a microprocessor 302, which is interconnected to current and voltage sensors 304 and volatile and non-volatile memory 306, to collect data indicative of power usage for the particular site being monitored. Microprocessor 302 is also connected to transceiver 308, which may be configured as a half-duplex radio, to transmit its data and receive data from other wireless meters via antenna 310, which may be an omnidirectional antenna.

Figure 4:
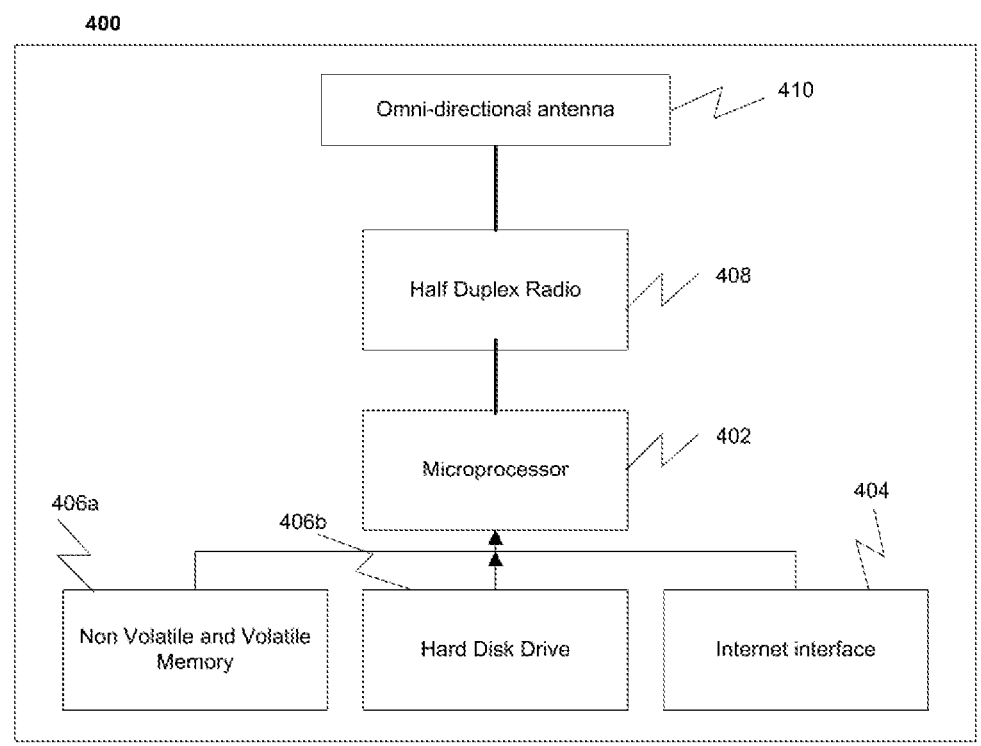
FIG. 4 is a block diagram of an exemplary controller, which may be configured to operate according to this disclosure.

Wireless controller 201, also contains a wireless transceiver configured to operate according to the same protocol as the wireless meters, and it may be configured according to the block diagram of wireless controller 400 depicted in FIG. 4. Wireless controller 400 may include a microprocessor 402, which is interconnected to internet interface 404 and volatile and non-volatile memory 406a as well as hard disk drive 406b. Microprocessor 402 is also connected to transceiver 408, which may be configured as a half-duplex radio, to transmit data to and receive data from wireless meters via antenna 410, which may be an omnidirectional antenna.

The internet interface 404, may be a wireless or wired connection, allowing the wireless controller to be connected to the internet in order to enable communications of meter data collected by the wireless meters to a central data collection center. The central data collection center may be operated, for example, by the utility company providing power to the individual users being monitored by the wireless meters. It may alternatively be operated by the vendor providing the power meters as a means for aggregating data into Internet based storage where it can be analyzed by one or more servers. The meter data may also be stored on a hard disk drive 406*b* in the event of transmission trouble to the central data collection center.

Referring again to FIG. 2, for example, when wireless meter 206 transmits, since its transmission will be omnidirectional, it is likely to be seen/received by all of the wireless meters which surround it, which in this example include wireless meters 205 and 207 in the same hop group as well as wireless meters in adjacent hop groups; namely, wireless meters, 209, 210 and 211 in hop group 3 and wireless meters 202, 203, and 204 in hop group 1. Depending on the proximity to other wireless meters and the transmission strength/reception sensitivity of the transceivers, it is possible additional wireless meters within hop groups 1, 2 or 3, may also receive the data transmitted from wireless meter 206. By definition, data transmitted from wireless meter 206 will not be seen/received by controller 201 or by any of the wireless meters in hop 4, as they are more than one hop group away. Nodes which transmit packets which must traverse the same number of intermediate nodes on their way to a controller are designated to reside in the same hop group.

Wireless network 200, FIG. 2, may utilize standard Network Coding, as described above, but by utilizing the improved protocol according to an aspect of this disclosure, increased transport capacity will be achieved. With network coding, the payload of each packet is fixed in size to allow linear aggregation. For convenience the header may also be fixed in size, allowing each packet to occupy a fixed time interval while being transmitted onto the network. Each of these time intervals may be referred to as a "Time Slot". For a given polling rate, for example, once every 15 minutes, there are a fixed number of available timeslots in which nodes may be scheduled to deliver their data. This is based upon the data rate of the channel, the size of the packets, the overhead for each packet, and the inter-packet gaps required by the receivers to properly synchronize. Each transmission system may have unique values for these parameters. The improved protocol according to an aspect of this disclosure is described in greater detail below.

In the first phase of the improved protocol, wireless controller, such as wireless controller 201, goes through network or node discovery. Node discovery is well known and therefore only a general description is provided herein. For example, the MAC layer address of the wireless nodes in the network, e.g. wireless nodes 202-216, may be registered manually with the wireless controller, and/or periodically the wireless controller may broadcast a poll to discover when any new wireless node(s) join(s) the network. Alternatively, the wireless controller may broadcast a request for all new wireless nodes, and recently powered up wireless nodes, to respond to a poll and to send data packets containing wireless node information to the controller on a hop by hop basis by whatever the native routing protocol is in use for that radio system.

For the purposes of this disclosure, the information from each wireless node transmitted to the wireless controller during network node discovery will include a wireless node identifier, as well as the following information:

Hop count from the wireless controller—e.g. the minimum number of hops/hop groups recent broadcast messages from the wireless controller traversed before reaching the wireless node.

A list of the addresses of all of the surrounding wireless nodes from which data has been received from the wireless node being polled. The address returned will typically be the MAC layer address assigned at the factory but may be shorter system or group level addresses assigned by the controller, or a hash function of the MAC address for uniquely identifying nodes but not carrying back the full collection of MAC addresses. In the case of a hash collision the controller could re-poll a given node for the full MAC address of designated hash entry.

The wireless controller may use the collected information to construct a graph of the connectivity between nodes. This is a graph of every wireless node along with all of the neighbors which it has directly observed. Once the controller has discovered and polled all of the active nodes in the network, it runs a topology mapping optimization which seeks to achieve the following objectives:

Assign wireless nodes a hop designation indicative of the minimum number of hops from the wireless controller.

Subdivide the overall network into node pools, where the maximum node pool size is dictated by the acceptable overhead of including a number of coefficients in the header of the data packet, or memory constraints of the wireless node's processor. Each of the wireless nodes in the network is assigned to a node pool. Wireless nodes in a given node pool will linearly aggregate their own packet data into packets from the wireless nodes in their node pool.

Where possible, ensure that each wireless node has at least two if not more redundant paths through the meshed network for delivering data to the wireless controller.

Identify network pinch points where the minimum redundancy requirement cannot be met given the above assignments, and where physically available, assign wireless nodes to also act as forwarders for one or more additional node pools. Wireless nodes which are assigned to act as forwarders will forward traffic received from wireless nodes of other node pools. If an assigned node has already received packets from the same non-local node pool (i.e. a node pool other than the node pool of the forwarding node) and has not yet forwarded it, it may either replace the pending packet or network code the new packet into the designated buffer, so that the linear combination will be transmitted when the opportunity arises. Nodes which are designated to forward packets for other node pools will only linearly aggregate their own packet data into packets received from wireless nodes in their same node pool. Certain aspects of the disclosure described in detail below with respect to wireless controllers may be applied to such forwarding nodes as well and when describing such aspects of the disclosure forwarding nodes and/or wireless controllers may also be referred to herein as "consolidating nodes."

As described above, the maximum node pool size is dictated by the overhead in the data packets. This is further described with regard to a specific embodiment of this disclosure, wherein Zigbee radios are used to transmit packet data between and among wireless nodes and the wireless controller. With Zigbee radios, the packet payload is limited to 127 bytes. If the meter data from a wireless node that needs to be provided to the wireless controller is, for example, 50 bytes, and the packet header is 8 bytes, then at most 69 additional bytes may be used for linear aggregation using network coding, which may include supplemental information such as coefficients and node addresses (if required for decoding).

In one embodiment it is desirable to use fixed byte positions in the header for the implicit designation of the sub-address of the node (within a pool) which delivered a particular packet or linear combination of packets. The position represents a relative node assignment within a pool as delivered by the controller during each node's configuration phase. The controller can correlate the presence of a coefficient in a given position in the header using a lookup table. The pool ID is appended to the location of the coefficient in the packet and then used as an index to look up the full MAC address in a table.

Figure 5:
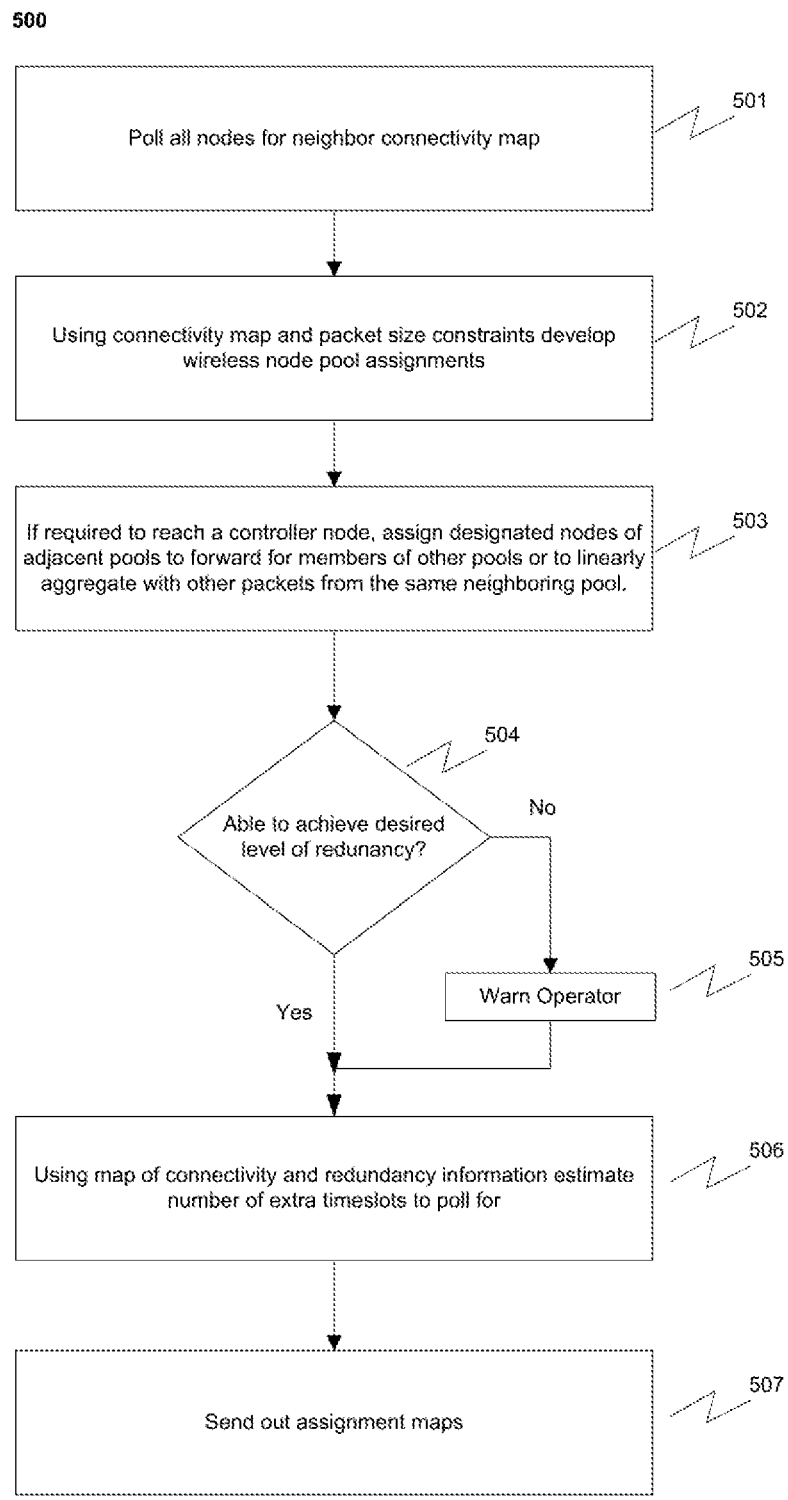
FIG. 5 depicts a flow chart for determining the assignment of wireless nodes to wireless node pools according to an aspect of this disclosure.

Referring to FIG. 5 there is shown a flow chart 500 describing one embodiment for determining the assignment of wireless nodes to wireless node pools to linearly aggregate data, assigning some wireless nodes to just forward data, and assigning yet other nodes to both linearly aggregate data from wireless nodes within their own node pool and to linearly aggregate and forward data for wireless nodes in other wireless node pools.

In step 501, the controller individually polls all of the nodes in the network to determine which nodes they are connected to. These are the neighboring nodes they are able to receive packets from. This information is then used to develop a connectivity map.

In step 502, using the connectivity map developed in step 501, node pool assignments are made. There are multiple options for how to assign nodes into node pools. In one embodiment, and as previously described, there is a 69 coefficient limitation per packet, and therefore a limit of 69 node members in any node pool.

It is preferable to create node pools which are as close to this limit as possible and as geographically compact as possible to optimize the density of connectivity. The following are some of the methods which can be used to assign nodes to an associated node pool while adhering to system constraints.

The simplest embodiment for assigning node pools would be to randomly assign each node to a pool with the constraint that no pool exceeds the maximum number of nodes per pool. Using this approach, the total $N_{nodes}$ is divided into $n_{node\ pools} = \lceil N_{nodes}/N_{node\ pool} \rceil$ pools, where each node pool will then have the maximum node density. However, this method does not optimize for spatial considerations, as each node pool distribution is randomized.

Another embodiment for node pool assignment is to divide the network into radial "pie" slices. This can be accomplished by sorting the nodes by their angle from the hub and binning the list into groups of equal size. Here, a minimum number of node pools is achieved, and have incorporated a spatial constraint where nodes within a common node pool are within a given "pie" region. An example of this approach is described below with regard to FIG. 7.

Optimizations over the radial pie slice approach to improve the density of interconnected nodes within a node pool, may be achieved by using known state of the art techniques including "Fluid Density Models". This is described in Ferran Pars, Dario Garcia-Gasulla, Armand Vilalta, Jonatan Moreno, Eduard Ayguad, Jess Labarta, Ulises Corts, and Toyotaro Suzumura. Fluid communities: A competitive, scalable and diverse community detection algorithm. 10 2017.

An additional known state of the art optimization technique is called simulated annealing where an energy function is defined and then optimized. S. Kirkpatrick, C. D. Gelatt, and M. P. Vecchi. Optimization by simulated annealing, 220(4598):671-680, 1983.

In step 503, the network map, as developed in steps 501 and 502, is evaluated for the minimum path redundancy available to any node in passing its packets to a controller. For example, a threshold of two might be assigned, in which case a review is done to see if every node has at least two paths within its own node pool to reach the controller. If not, nodes which have adjacent connectivity, but which are assigned to different node pools are considered. If these nodes can provide the necessary redundancy, then they are assigned to provide neighbor forwarding for the designated node.

In step 504, if the necessary redundancy cannot be achieved, then in step 505 the operator is warned, perhaps on a graphical display, showing which nodes do not have adequate redundancy. The operator may in the future choose to physically augment the redundancy of the network by inserting an additional meter or repeater where the network is most in need of additional connectivity.

In step 506, the map of connectivity is examined to see the degree of connectedness for each node in a pool, and if there are nodes which have only a single neighbor with connectivity towards the controller with which they communicate. Also evaluated are the number of nodes which are behind this node which are dependent upon it to deliver their data. In this occurrence, additional cycles will be added to the allocated timeslots for polling this pool to account for possible transmission errors between these neighbors and to provide multiple opportunities for packets to traverse this link.

In step 507, the assignment maps developed in the previous steps are sent out individually to each node in the network.

Figures 6A, 6B, 6C:
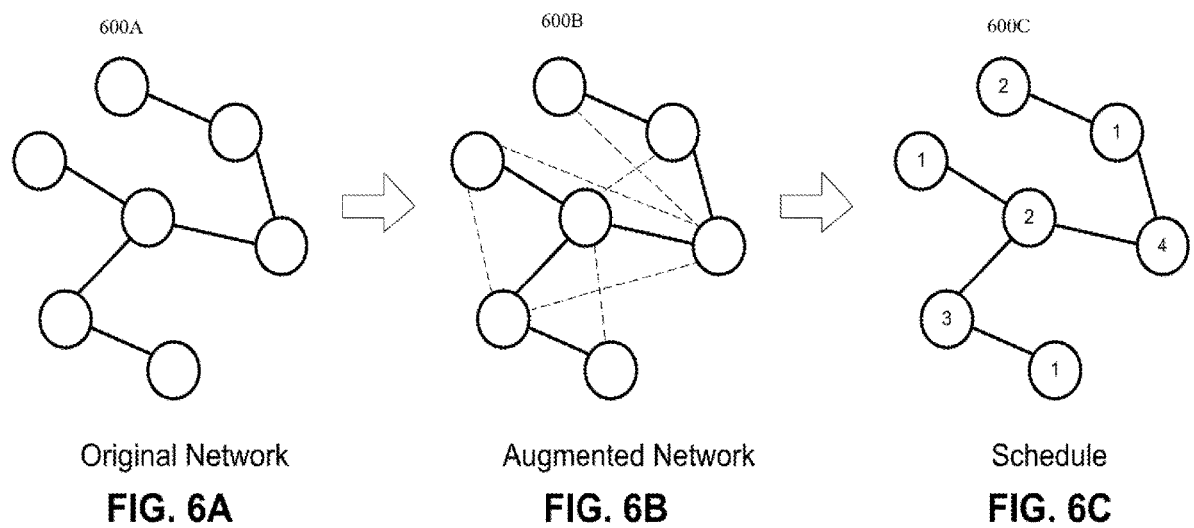
FIG. 6A depicts a network graph showing direct wireless node connections according to an aspect of this disclosure.
FIG. 6B depicts the network graph of FIG. 6A augmented to show both direct and expanded wireless node connections according to an aspect of this disclosure.
FIG. 6C depicts the original network graph of FIG. 6A labeled using a graph coloring algorithm which references the augmented graph 6B according to an aspect of this disclosure.

With the wireless nodes placed into wireless node pools, FIGS. 6A-6C, show how a graph of node to node connectivity may be used to determine which nodes may safely transmit simultaneously without causing loss of packets due to interference. Interference is where the transmitted packets from two or more wireless nodes sharing the same RF channel are received at one or more receiving wireless nodes and the relative signal strength of the received signals degrades the signal to noise ratio such that a given receiver is unable to discriminate between source transmissions and decode a valid packet. The end result is a received packet with an invalid cyclic redundancy code (CRC), indicating the received packet is invalid and must be discarded. Non-interfering wireless nodes (or nodes which do not interfere) are nodes which may transmit simultaneously and their transmitted packets are received by each of their receiving wireless nodes/controllers without interference (i.e. packets are received with a valid CRC).

A discovered or original network graph, for example network graph 600a, FIG. 6A, is initially augmented by connecting each wireless node to its neighbors' neighbors to create an augmented network graph 600b, FIG. 6B. The augmented network graph 600b shows each wireless node's neighbor connections via solid lines, while each wireless node is connected to its neighbors' neighbors via dotted lines. Subsequent to this, another network graph 600c, FIG. 6C, is created using a graph coloring algorithm, which assigns each node in the augmented network graph 600b a color such that no connected nodes share the same color. In this figure, the wireless nodes are labelled with a number (1, 2, 3, and 4), each of which indicates a different color.

To do this, the nodes are sorted by their degree (number of neighbors) and then the sorted list is traversed, assigning each wireless node one of the colors that none of its neighbors have yet been assigned. When it is not possible to assign a wireless node a color that does not conflict with any neighbor's, a new color is introduced and assigned to that wireless node. This approach produces a valid graph coloring solution. Graph coloring algorithms are well known in the art and are therefore not described herein in further detail.

After coloring the augmented network to produce colored network graph 600c, it is guaranteed that all nodes with a given color can transmit at the same time safely because these nodes do not share a neighbor in the original non-augmented network. For example, each node labeled "1" can transmit simultaneously without resulting in interference at any wireless node that receives data transmitted from the wireless nodes labelled "1".

As described above, the simultaneous transmission by wireless nodes labelled "1" will not result in received packets at other wireless nodes receiving the transmitted data with an invalid CRC due to interference from the simultaneously transmitting nodes. An invalid CRC indicates that the received packet is invalid and must be discarded. Using the colored network graph, each wireless node may then be assigned a transmission period equal to the total number of colors and an initial delay period based on the index of that wireless node's assigned color.

The wireless controller notifies the wireless nodes in each node pool of their designated transmission time slots. And, if not already provided to the wireless nodes, the following parameters may also be provided:
Its primary node pool ID (This is the node pool in which the wireless node reports its own data).
The node's relative address within the primary node pool, and therefore the position of its coefficient within packet headers.
A list of any other node pools this node should forward for.
The node's distance from the controller (In Hops)—Optionally, as affirmation as this is already known by the node.

Figure 7:
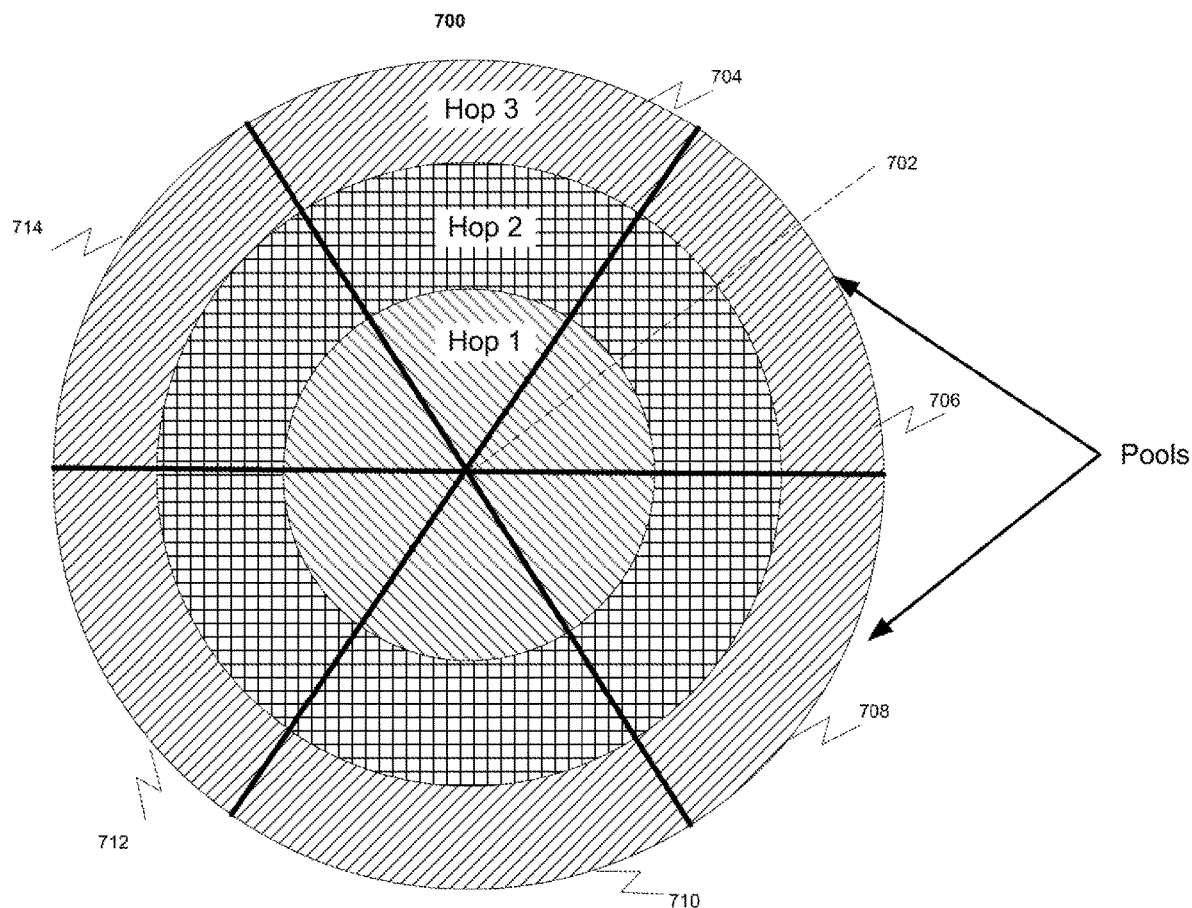
FIG. 7 depicts a representation of a network of wireless nodes divided into hop groups and grouped into node pools according to an aspect of the disclosure.

In FIG. 7 a representation 700 of a network of wireless nodes (not shown) is depicted as a series of concentric rings, each ring designates a hop from the center which is where the wireless controller 702 is located, wherein the wireless nodes are further grouped into node pools. For node pool assignment, the network may be divided into radial "pie" slices. This can be accomplished by sorting the nodes by their angle from the hub and binning the list into groups of equal size. Here, a minimum number of node pools is achieved, and have incorporated a spatial constraint where nodes within a common node pool are within a given "pie" region In this example, there are three hop groups; namely hop group 1, which includes wireless nodes closest to wireless controller 702, hop group 2 including wireless nodes position further from the wireless nodes in hop group 1, and finally hop group 3 with wireless nodes position furthest from wireless controller 702. Data packets from wireless nodes in Hop group 3 must be forwarded through Hop group 2 and then through Hop group 1 to reach their ultimate destination, which is the controller 702. In this example, the wireless nodes are grouped into six node pools 704, 706, 708, 710, 712, and 714. Each node pool contains one or more wireless nodes within each hop group.

In one embodiment, the maximum number of hop groups may be fifteen (15), corresponding the largest mesh which that embodiment supports. In particular, packets sent by members of group 15 must traverse at least fourteen (14) intermediate nodes on its transit to the controller. In general, the maximum hop count corresponds to the Time To Live Value (TTL), which is encoded into broadcast packets to limit packet retransmissions. Each time a packet is forwarded, its TTL is decremented. Packets received with a TTL less than or equal to 1 are not forwarded. Other embodiments may support larger or smaller TTL values depending upon the geographic region which must be supported by a single meshed network. These are retransmitted until their TTL values reach 1.

In some embodiments, the number of node pools is divisible by three, e.g. 3, 6, 9, 12 etc. This is to enable interleaved delivery of packets to a central wireless controller (or a forwarding wireless node) every timeslot where possible.

Continuing to refer to FIG. 7, in general, for hop groups 2 and above, wireless nodes on the left edge of one node pool (i.e. nodes are geographically separated such that typically they do not interfere with each other) are two or more hops away from wireless nodes on the left edge of adjacent node pools. This implies that when a wireless node on the left edge of one node pool transmits, it is not seen by wireless nodes on the left edge of adjacent node pools. For additional insurance against inter-nodal interference, non-adjacent node pools may also provide additional spatial isolation during simultaneous transmissions.

In one embodiment, wireless node transmission is half duplex. A wireless node may transmit or receive, but not both simultaneously except for collision detection purposes (such as in CSMA/CD). The wireless controller is similar to other nodes, however when receiving packets on a single channel, when it is not sending outbound polls, it may be capable of receiving one packet per available timeslot.

In this embodiment, all of the wireless nodes and the wireless controller may share a single radio channel and interleave between node pools such that a controller receives one packet every available time interval. In another embodiment, adjacent node pools may use different RF channels to minimize interference between node pools. Adjacent node pools are one which have one or more wireless nodes which are able to properly receive (without CRC errors) packets from one or more nodes participating in a neighboring node pool. In this embodiment, the central controller may alternate between the channels used by the various pools to receive a message every available time interval.

It is an objective of this invention to organize the transmission of packets in space, time and frequency such that one independent linear combination packet may be delivered to a controller in every available timeslot where new data is available, and the controller is not sending packets or polls.

In the limiting case, and in the absence of transmission losses, even with a multiplicity of hops, 1,000 nodes may deliver their data in 1,000 timeslots. This also corresponds to the theoretical limits of a network which is limited by a one packet per timeslot reception capability of the controller itself. This so-called "min-cut" limit is explained in Network Coding Fundamental and Applications, Medard and Sprintson, Section 3.1.

Additional independent receivers may be added at one or more controllers to further increase the capacity of the network beyond that which may be absorbed by a single controller radio or as an alternative to hopping between frequencies.

Figure 8:
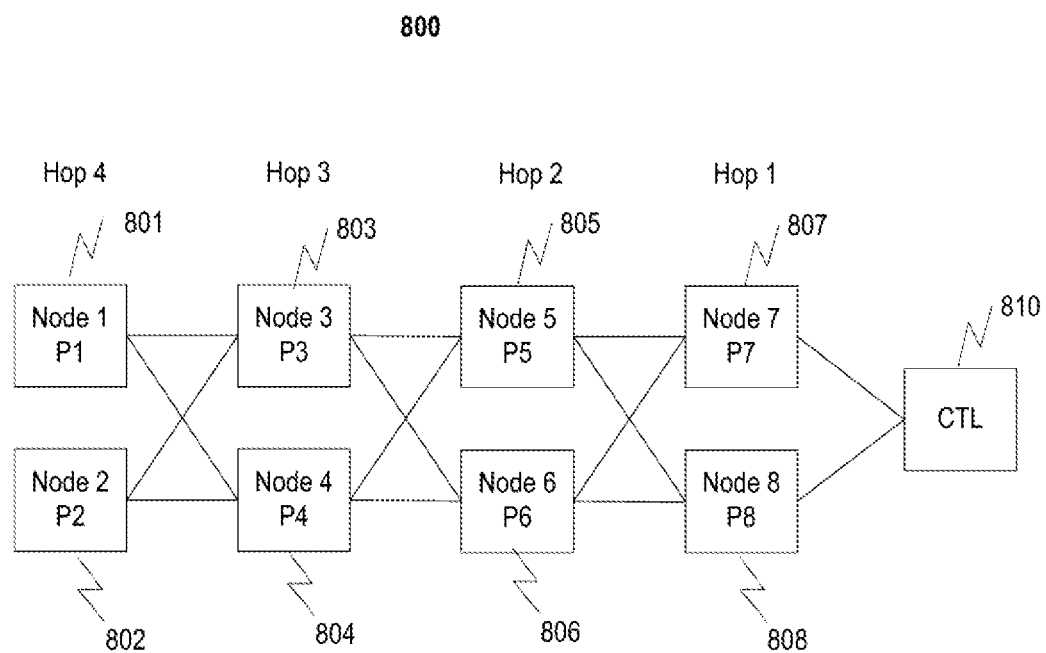
FIG. 8 is a diagram of one possible topology for a directed flow of packets from the edge of a network to a controller with wireless nodes grouped into a single node pool, according to an aspect of this disclosure.

FIG. 8 shows an exemplary network for delivering data to a controller, according to an aspect of this disclosure. A directed graph topology 800 including wireless nodes/meters 801-808, labelled nodes 1-8, and referred to herein interchangeably, and a wireless controller 810. The wireless nodes are divided into four hop groups; namely, hop group 4 (nodes 1 and 2), hop group 3 (nodes 3 and 4), hop group 2 (nodes 5 and 6) and hop group 1 (nodes 7 and 8). In this simple example, there is only a single node pool containing all eight nodes.

The transmission of packets in this topology and according to the protocol herein is described. The nodes between which packets are transmitted are indicated by solid lines connecting the nodes. For example, data packets transmitted by Node 1 are received by Nodes 3 and 4, because they are in the adjacent hop group (hop group 3), but they are not received by Nodes 5, 6, 7, 8 or wireless controller 810, as they are more than one hop group away. Similarly, packets transmitted from Node 5 are received by nodes 3, 4, 7 and 8. However, the packets from node 5 which are received by Nodes 3 and 4 are discarded as the packets are from a node in a lower hop group indicating that the data is being transmitted away from the wireless controller which is the intended destination. The packets transmitted by Node 5 and received by Nodes 7 and 8 and are combined with the data in nodes 7 and 8 and for forwarded to controller 810 in a subsequent timeslot.

Although not represented in FIG. 8, transmissions from Node 1 may be seen by Node 2 and similarly transmissions from Node 3 may be seen by Node 4, etc. These intra-hop group transmissions may be used to provide additional redundancy which may also improve the robustness of the network. In one embodiment with a single active controller, data is allowed to flow sideways (i.e. intra-hop group transmission) and forward through the network, but not backwards towards higher hop counts. In other embodiments, with multiple controllers, either for redundancy or for additional capacity and sharing of the same RF channel, data may be aggregated in all directions.

It is an objective to move data through the network at the highest possible rate based upon the limitations of the transmission system. In one embodiment, since the nodes are half duplex and omnidirectional, it is necessary that only one node from every third hop in the network and within a single node pool, transmit simultaneously. Otherwise, there would be interfering transmissions and data would not be received. For example, in FIG. 8, if both nodes 1 and 5 transmit at the same time, nodes 3 and 4 will receive data from both nodes 1 and 5 preventing nodes 3 and 4 from receiving the data packets from either nodes 1 or 5. While the aggregation and propagation of packets is generally directed to controller 810, which is at the right edge of the network 800, the radios typically have omnidirectional antennas and receive transmissions which are in range from every direction. In contrast, even when using omnidirectional antennas, when Node 1 is transmitting, Node 7 may also transmit without causing interference, because the nodes are separated by more than two hop groups.

Referring now to FIG. 9, table 900 shows the construction of packets for forwarding from the nodes 801-808 to the controller 810, as shown in FIG. 8. The cycle count vertical axis represents the transmission timeslots available in the network. The numbers in the table represent the nodes whose packets are merged together in linear combinations with independent coefficients using Network Coding, as described above. For example, the cell represented by Cycle 3 and Node 5 contains the value 1, 3, 5. This means that Node 5 will transmit a packet which contains a linear combination of data from Node 1, Node 3 and Node 5 during the cycle 3 timeslot. In this example, with all nodes being part of the same node pool, the packet data received from any of the multiple nodes may be merged using Network Coding.

Continuing to refer to table 900 it can be seen that when possible, two nodes transmit simultaneously, such as nodes 1 and 7 in time slots (cycle) 1, 7, 13, and 19, and nodes 2 and 8 in time slots 4, 10, 16, and 22. In this example, nodes which are at least three hop groups apart may be assigned to transmit simultaneously. Other methods to assign nodes to transmit simultaneously may be used, including using a generic coloring algorithm to determine which nodes may transmit simultaneously without interfering.

For the omnidirectional, half duplex nodes, in this example, a group of nodes in a single node pool is able to deliver one linearly independent packet to the controller every third cycle, as shown in the column labelled "Aggregation" where the node 7 packets are delivered to the wireless controller 810, FIG. 8, in time slots 1, 7, 13, and 19, and node 8 in time slots 4, 10, 16, and 22. The same approach may be used with a wireless node which is used to forward packets, In place of the wireless controller 810 may be a forwarding node which may either forward packets towards a wireless controller, or linearly merge packets with other packets received from the same node pool as the packet just received using network coding. The merged packets are forwarded as consolidated data on through the network to ultimately be received by a wireless controller. The forwarding node will typically be part of a different node pool than the node pool(s) of the nodes for which it is forwarding. Either a wireless controller or a forwarding node may also referred to herein as a consolidating node.

Figure 10:
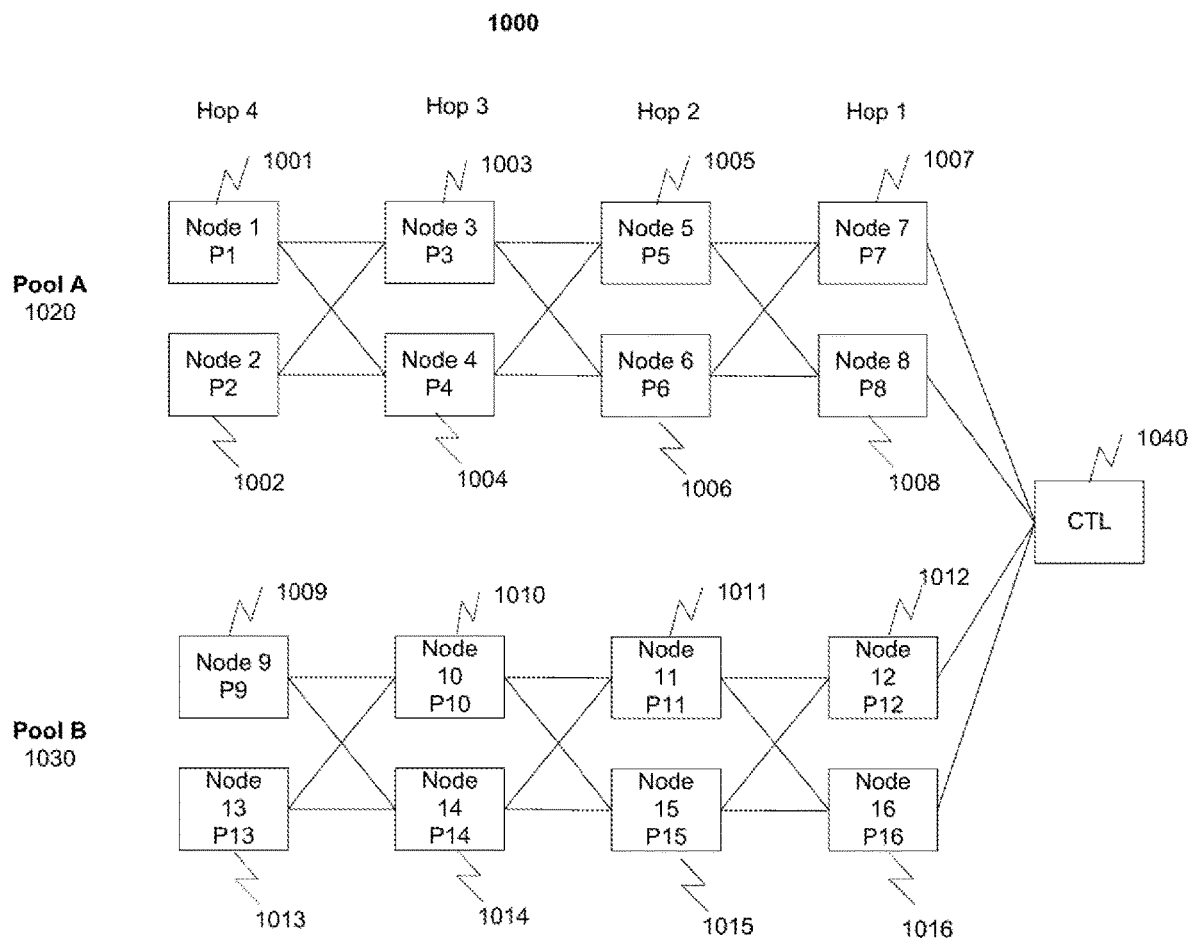
FIG. 10 is a diagram of another possible topology for a directed flow of packets from the edge of a network to a controller with wireless controllers grouped into two node pools, according to an aspect of this disclosure.
Figure 12:
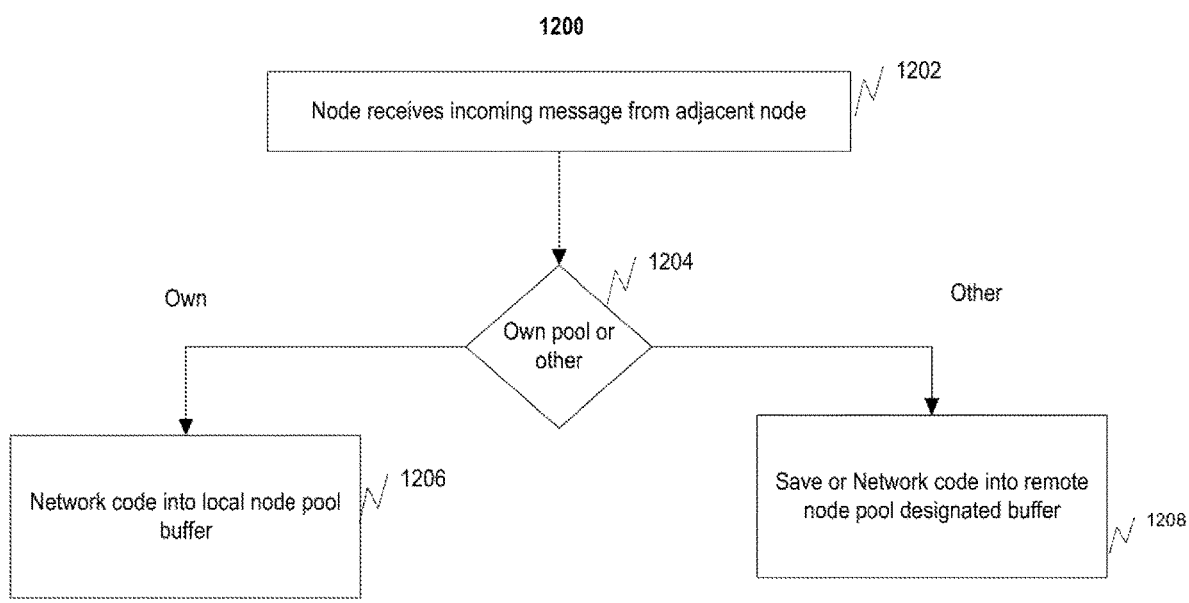
FIG. 12 is a flow chart depicting the process of a node receiving an incoming data packet.

FIG. 10 shows another example network 1000 (or portion thereof), including nodes/meters 1001-1008 grouped in node pool A 1020 along with wireless nodes/meters 1009-1016 grouped into a separate node pool B 1030. Wireless nodes/meters 1001-1016, labelled nodes 1-16, and may be referred to herein interchangeably. The nodes from both node pools A 1020 and B 1030 are polled by and deliver their data to wireless controller 1040 (which may also be replaced with a forwarding node). In general, because these nodes may be geographically proximal, it is necessary to recognize which nodes in adjacent pools may interfere and therefore schedule their transmission timeslots so that this will not occur. Alternatively, different channels may be used for each group, and the controller will alternate between them based upon which group is scheduled to deliver a data packet.

In one embodiment node pools are grouped into sets of three or multiples of three pools, with each pool delivering data to the controller on a staggered cycle. The staggered transmissions make it is possible to fill in every transmission cycle seen by the controller, when it is not transmitting. The staggering of transmissions to the wireless controller or a forwarding node (i.e. a consolidating node) means that any wireless node transmitting to a consolidating node will do so in a time slot which is adjacent to a time slot during which a wireless node of another node pool transmits. This approach of staggering transmissions between node pools occurs across the wireless mesh network and is further described below with regard to FIG. 11.

It is understood that for other embodiments, pool groupings will be other than a multiple of three, the only requirement being that the organization of nodes in adjacent pools be such that they do not cause collisions at any other node which is required to forward transmissions. This may be accomplished through spatial or frequency separation.

Adjacent node pools are one which have one or more wireless nodes which are able to properly receive (without CRC errors) packets from one or more nodes participating in a neighboring node pool. Referring to node pools A and B of FIG. 10. When node 1008 in Pool A transmits, node 1012 in Pool B may be able to properly receive node 1008 transmissions. Similarly, node 1006 in Pool A may be able to properly receive packets from node 1011 in Pool B if they are within radio reception range of each other.

Referring now to FIG. 11, table 1100 shows the construction of packets for forwarding from the node pools A 1020 and B 1030 to the controller 1040, as shown in FIG. 10. As with table 900, FIG. 9, the cycle count vertical axis of table 1100 represents the transmission timeslots available in network 1000, FIG. 10. Across the horizontal axis, in each column, there are corresponding pairs of nodes, one from each node pool, which alternate transmission time slots. In the first column are nodes 1 and 9 and in the second column nodes 2 and 13, which are furthest in distance from controller 1040, as they are in hop group 4. In the third column are nodes 3 and 10 and in the fourth column are nodes 4 and 14. These four nodes are in hop group 3, which is the second furthest hop group from controller 1040. This pattern continues until the eighth column, where there are the final two nodes 8 and 16 from hop group 1.

As shown in the table 11, the nodes furthest from the controller 1040 and on the left edge of network 1000 transmit first and the transmission times progress from the left edge (furthest from controller 1040) to the right edge (closest to controller 1040) of network 1000. The numbers in the table represent the nodes that are transmitted each cycle and the nodes whose packets are merged together in linear combinations with independent coefficients using Network Coding, as described above.

As shown, in cycle 1, nodes 1 (node pool A), 10 (node pool B), and 7 (node pool A) initially transmit their data. They have been determined to be non-interfering with each of the others' receiving nodes so they can transmit simultaneously. Similarly, in cycle 2, Nodes 9 (node pool B), 3 (node pool A), and Node 12 (node pool B) transmit simultaneously. Thus, for each of these wireless node transmissions in a given time slot (cycle 1), the adjacent slot (cycle 2) includes a transmission from another node pool. It should be noted that Node 3 contains its data as well as linearly merged data received from node 1. In these first two adjacent cycles (or adjacent time slots) Nodes 7 and 12, which are in hop group 1, respectively transmit their data to the controller 1040, as shown in the column labeled "Aggregation". Therefore, node 7 (node pool A) and node 12 (node pool B) from different node pools transmit their data to the controller 1040 in adjacent time slots. This staggering approach is carried out across all wireless nodes in network 1000, as described below.

In cycle 3, only Nodes 5 and 11 transmit their data, which are received by nodes 8 and 16, respectively. Node 5 data is the linear aggregation of data from Nodes 1, 3, and 5 and Node 11 data is the linear aggregation of data from Nodes 10 and 11. Note, that in cycle 3 no data is transmitted from the hop group 1 nodes to the controller 1040.

In adjacent cycles/time slots 4 and 5, Nodes 8 and 16, respectively, transmit their aggregated data to controller 1040. In addition, Nodes 2 and 14 transmit in cycle 4 and 13 and 4 transmit in cycle 5. In cycle 6, merged data from nodes 6 and 15 are transmitted but in cycle 6 no data is transmitted from the hop group 1 nodes to the controller 1040, as is the case for cycle 3. This ends one full transmission round through network 1100 and the same transmission pattern begins again at cycle 7. Thus, every 6 cycles all nodes in hop group 1 (Nodes 7, 8, 12, and 16) transmit their data to controller 1040. In all cases except for the two initial cycles the data from Nodes 7, 8, 12, and 16 is aggregated data from each node's upstream neighbors, residing in the same node pool.

It should be further noted that a third group (not shown) may also be added to fill the third aggregation timeslot; namely, cycles 3, 6, 9, . . . etc. Alternatively, Group B 1030 may operate on a different frequency from Group A 1020. In this case the controller 1040 may alternate between channels.

The transmission processes described above with regard to FIGS. 8/9 and 10/11 are periodically initiated (e.g. every 15 minutes) by the wireless controller(s), such as controllers 810, FIG. 8, and 1040, FIG. 10. In one embodiment the wireless controller(s) may poll multiple nodes in one or more node pools simultaneously with a single broadcast or multicast message. In this way a single poll can initiate a timed cascade of messages from the nodes, thereby maximizing the number of timeslots which are available for delivery of data to the controller.

In order for the controller(s) to be able to poll either a subset of, or all of the nodes in a node pool using a single poll, it is necessary that the nodes adhere to a schedule like the ones in table 900, FIG. 9, and 1100, FIG. 11. To do this, each node be synchronized in time with other nodes in each group. This is necessary for the node to determine when to begin transmitting into its scheduled timeslots. In this way nodes are able to transfer data without interference from adjacent nodes and the additional delays which contention access can cause.

This may be done by broadcast flooding with a time to live constraint (e.g. the maximum number of times a poll is retransmitted by subsequent nodes), or ensuring that the path traversed by a multicast poll takes within a node pool is preconfigured by the controller and therefore deterministic in hops, time to live and desired level of broadcast redundancy in a given pool. Using the time of the receipt of a poll, and knowing the number of hops preceding its receipt from the controller (from the decremented Time To Live variable in the header), along with the transmission time and the typical delay time for packet receipt and processing at each hop, each node can ascertain how far back in time the poll was first launched. It then updates its own time reference for packet timeslots.

In an alternative embodiment timeslot timing is ascertained by having nodes at the furthest edge of the network begin the data delivery sequence upon receipt of a group poll from the controller, and then interior nodes align their estimates of timeslot timing from the time of arrival of these inbound packets.

In FIGS. 12 through 15 the processes for transmitting and receiving data by the wireless nodes and the wireless controller, according to aspects of this disclosure, are depicted. Referring to flow chart 1200 in FIG. 12, incoming data from an adjacent node is received by a wireless node at step 1202. At step 1204, it is determined if data received was transmitted by a node in the node pool of the node receiving the data or from another node pool (i.e. a remote node pool). If the data received is from a node within the node pool of the node receiving the data, it is Network Coded into the current coding pool and stored in the local node pool buffer at step 1206. If the data received is from a node within another node pool, as determined at step 1204, and the remote pool buffer reserved for this pool is currently empty, then the data packet as received (i.e. not Network Coded) is stored in the designated remote pool buffer at step 1208. If the buffer is already occupied with a packet from the same node, or any other node of the same remote node pool, then the received packet is network coded into the remote pool designated buffer at step 1208. When network coding into a remote pool buffer, the local node's data is not utilized.

Figure 13:
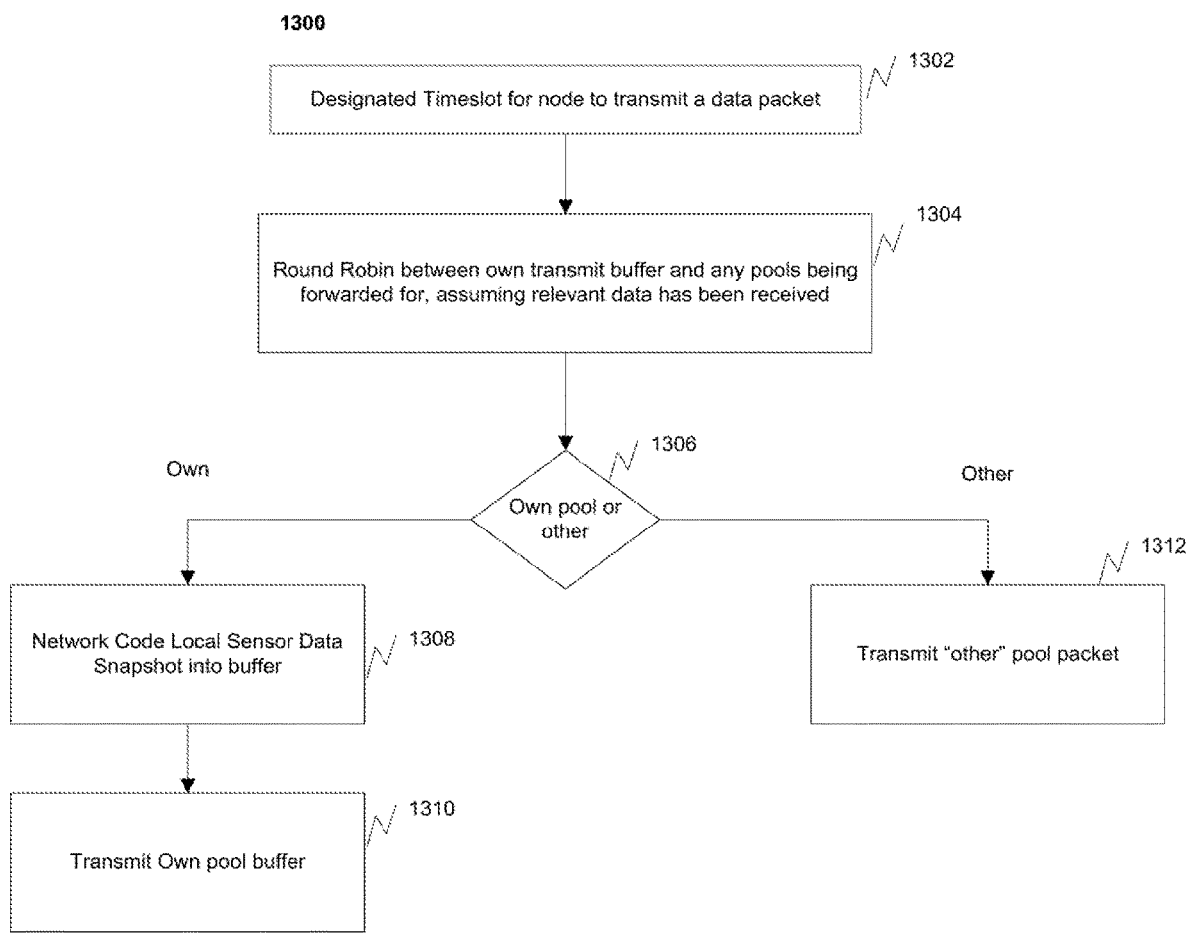
FIG. 13 is a flow chart depicting the process of a node transmitting a data packet.

The process for transmitting data packets for a wireless node is shown in flow chart 1300 of FIG. 13. At step 1302, it is determined that the designated time slot (i.e. cycle per tables 900/1100 shown in FIGS. 9 and 11) for the node to transmit data has arrived. In step 1304 a rotating selection process is initiated in the time slot to alternate transmitting from the node's own pool transmit buffer and from the remote buffers storing other node pool data. In step 1306, based on inputs from step 1304, the process alternates between transmitting data from the node pool of the current node and the data received from nodes in other node pools. When it is time to transmit from the current node pool, a timed snapshot of data from the current node, i.e. current node sensor data, such as electric meter data, is retrieved and is Network Coded with the data received from other nodes in the current node's node pool and stored in the current pool buffer at step 1308. In step 1310, the network coded data is transmitted. Based on subsequent signal provided as part of the round robin process of step 1304, in step 1306, the transmission of data from nodes in other node pools stored in the remote buffers are transmitted in step 1312.

Figure 14:
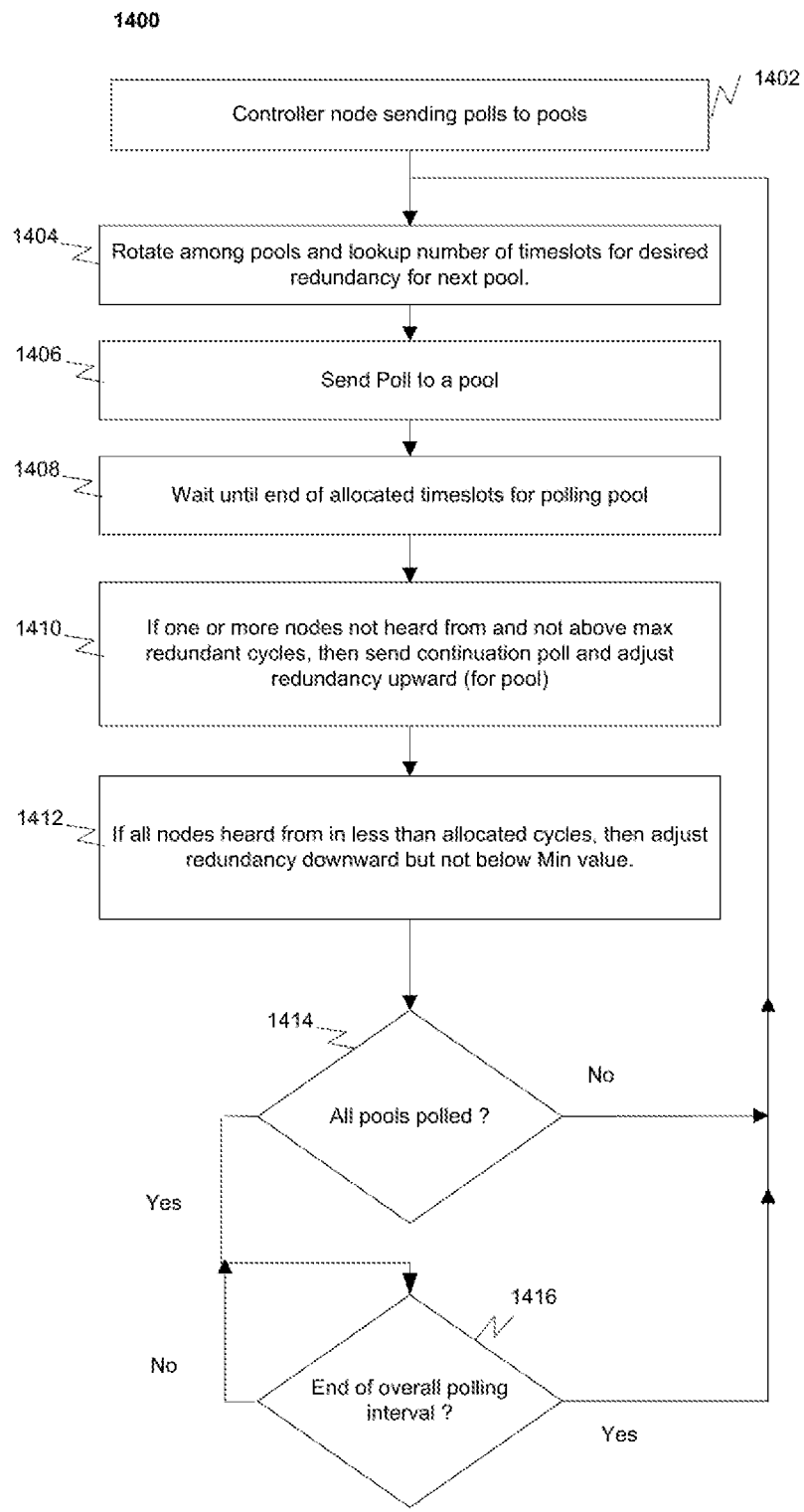
FIG. 14 is a flow chart depicting the process for a controller node transmitting node pool polls.

Referring now to FIG. 14, there is shown flow chart 1400 which depicts the wireless controller process for polling the wireless nodes in the network to initiate transmission of the data from the wireless nodes. As described above at the beginning of each data collection cycle, the controller initiates the pooling process, as indicated at step 1402. At step 1404, the controller rotates among pools and looks up the number of time slots for desired redundancy for next pool. In general, the number of time slots is greater than the minimum number which would be required to receive a single independent packet for every member of the node pool in the absence of any errors. Additional timeslots are necessary to ensure that sufficient independent packets are received by the controller to enable decoding the packet data from every transmitting node.

At step 1406, the controller transmits the node pool poll and at step 1408 the controller waits until the end of the allocated time slots for the pool being polled. At step 1410, if one or more nodes in the pool are not heard from, and the number of timeslots assignment has not exceeded a designated maximum number of redundant cycles, then a continuation poll is sent and the redundancy for the node pool for future polling events is adjusted upward. At step 1412, if all nodes have been heard from in less than the allocated cycles, then the redundancy is adjusted downward but not below a minimum value.

The process then proceeds to step 1414, where it is determined if all groups have been polled. If all groups have not yet been polled, the system returns to step 1404 and the polling process continues. If at step 1414 it is determined that all node pools have been polled the system proceeds to step 1416 where it is determined if the overall polling interval has ended. If it has, the system returns to step 1404 to await the next polling interval. If the polling interval has not ended, the system loops back to step 1416 and continues to wait until the overall polling period has ended.

Figure 15:
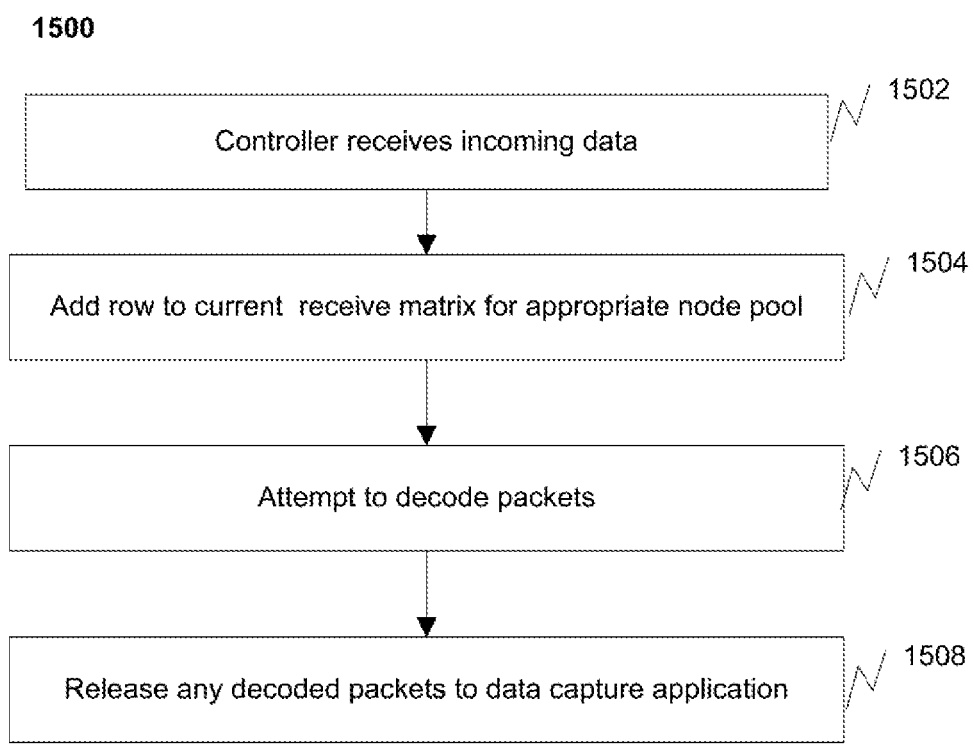
FIG. 15 is a flow chart depicting a controller receiving and decoding an encoded incoming data packet from the network.

The controller process for receiving incoming data from wireless nodes is depicted in flow chart 1500 of FIG. 15. At step 1502 the controller receives incoming data from a wireless node. In step 1504, the received data is added to the current receive matrix for appropriate node pool and in step 1506 the data packets from the receive matrix are attempted to be decoded using well known matrix inversion techniques such as Gauss Jordan elimination. In step 1508, any decoded data packets are released to the data capture application for processing and/or transmission to a central data collection center operated, for example, by the utility company providing power to the individual users being monitored by the wireless nodes/meters.

While the foregoing description enables one of ordinary skill to make and use what is considered presently to be the best mode of Network Coded remote metering networks, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above described embodiments and examples, embodiments, and applications within the scope and spirit of the invention claimed as follows.

We claim:

1. A method for transmitting node data in a wireless meshed network from a plurality of wireless nodes to at least one consolidating node, such that the at least one consolidating node periodically receives node data from each of the plurality of wireless nodes, the method comprising:
   assigning each of the plurality of wireless nodes to one of a plurality of node pools;
   causing each of the plurality of wireless nodes to transmit node data to one or both of other wireless nodes and the at least one consolidating node during assigned time slots, wherein each wireless node transmits its node data during timeslots which are adjacent to timeslots during which a wireless node from another node pool transmits its node data; and
   wherein the node data for each wireless node includes data originating at the wireless node and wherein each wireless node is configured to receive node data from other wireless nodes of the same node pool and node data from other wireless nodes of a different node pool; and
   wherein the data originating at the wireless node are linearly aggregated using network coding, only with the node data received from other wireless nodes of the same node pool.

2. The method of claim 1 wherein the consolidating node is one of a wireless controller or a wireless node assigned to forward node data from a wireless node in another node pool to ultimately be received by a wireless controller.

3. The method of claim 2 wherein the wireless nodes are grouped into N hop groups based on their physical distance to the at least one consolidating node.

4. The method of claim 3 wherein each of the plurality of node pools includes at least one wireless node in each of the N hop groups.

5. The method of claim 3 wherein the at least one wireless node in each node pool in a hop group can transmit node data in the same timeslot as a non-interfering wireless node within another node pool.

6. The method of claim 3 wherein the at least one wireless node in a node pool in a hop group can transmit node data in the same timeslot as a non-interfering wireless node within the same node pool in a different hop group, wherein the different hop group is at least three hop groups away of from the hop group of the at least one wireless node.

7. The method of claim 3 wherein the node data received by each wireless node from another wireless node of the same node pool includes node data transmitted from a wireless node in a hop group physically closer to the consolidating node than the hop group of the wireless node receiving the node data.

8. The method of claim 7 wherein each of the plurality of wireless nodes includes an electric meter for measuring usage of electricity and wherein the node data transmitted includes an amount of electricity used as measured by the electric meter.

9. The method of claim 3 wherein the wireless controller is configured to construct a network map of the plurality wireless nodes, wherein the network map includes for each of the plurality of wireless nodes a network identifier, a hop group identifier indicating the hop group in which the wireless node resides, and the network addresses of the surrounding wireless nodes from which each such wireless node has received node data.

10. The method of claim 9 wherein the network map is used to assign each of the plurality of wireless nodes to one of the plurality of node pools.

11. The method of claim 10 wherein the total number of node pools is evenly divisible by three.

12. The method of claim 1 wherein the time slots are assigned so that the node data transmitted by each wireless node will not interfere with the node data transmitted by any other wireless node in the wireless meshed network.

13. The method of claim 1 wherein the node data received from the wireless node of said different node pool are linearly aggregated only with node data received from another wireless node of said different node pool.

14. The method of claim 1 wherein the node data to be transmitted from the plurality of wireless nodes is transmitted in data packets having a predefined data packet size with an available number of bytes to store coding coefficients for network coding, and wherein the maximum node pool size is limited to a number of wireless nodes for which the corresponding coding coefficients can be stored in the available number of bytes.

15. A system for transmitting node data in a wireless meshed network, comprising:
a plurality of wireless nodes configured to transmit and receive node data; each of the plurality of wireless nodes assigned to one of a plurality of node pools;
at least one consolidating node configured to periodically receive node data from each of the plurality of wireless nodes,
wherein each of the plurality of wireless nodes is configured to transmit node data to one or both of other wireless nodes and the at least one consolidating node during assigned time slots, wherein each wireless node is configured to transmit its node data during timeslots which are adjacent to timeslots during which a wireless node from another node pool transmits its node data; and
wherein the node data for each wireless node includes data originating at the wireless node and wherein each wireless node is configured to receive node data from other wireless nodes of the same node pool and node data from other wireless nodes of a different node pool; and wherein the data originating at the wireless node are linearly aggregated using network coding, only with the node data received from other wireless nodes of the same node pool.

16. The system of claim 15 wherein the at least one consolidating node is one of a wireless controller or a wireless node assigned to forward node data from a wireless node in another node pool to ultimately be received by a wireless controller.

17. The system of claim 16 wherein the plurality of wireless nodes are grouped into N hop groups based on their physical distance to the at least one consolidating node.

18. The system of claim 17 wherein each of the plurality of node pools includes at least one wireless node in each of the N hop groups.

19. The system of claim 17 wherein the at least one wireless node in each node pool in a hop group is configured to transmit node data in the same timeslot as a non-interfering wireless node within another node pool in the same hop group.

20. The system of claim 17 wherein the at least one wireless node in a node pool in a hop group is configured to transmit node data in the same timeslot as a non-interfering wireless node within the same node pool in a different hop group, wherein the different hop group is at least three hop groups away of from the hop group of the at least one wireless node.

21. The system of claim 17 wherein the wireless controller is configured to construct a network map of the plurality wireless nodes, wherein the network map includes for each of the plurality of wireless nodes a network identifier, a hop group identifier indicating the hop group in which the wireless node resides, and the network addresses of the surrounding wireless nodes from which each such wireless node has received node data.

22. The system of claim 21 wherein the network controller is configured to use the network map to assign each of the plurality of wireless nodes to one of the plurality of node pools.

23. The system of claim 22 wherein the total number of node pools is evenly divisible by three.

24. The system of claim 17 wherein the node data received by each wireless node from another wireless node of the same node pool includes data transmitted from a wireless node in a hop group physically closer to the consolidating node than the hop group of the wireless node receiving the node data.

25. The system of claim 24 wherein each of the plurality of wireless nodes includes an electric meter for measuring usage of electricity and wherein the node data transmitted includes an amount of electricity used as measured by the electric meter.

26. The system of claim 15 wherein the time slots are assigned so that the node data transmitted by each wireless node will not interfere with the node data transmitted by any other wireless node in the wireless meshed network.

27. The system of claim 15 wherein the node data received from the wireless node of said different node pool are linearly aggregated only with node data received from another wireless node of said different node pool.

28. The system of claim 15 wherein the node data to be transmitted from the plurality of wireless nodes is transmitted in data packets having a predefined data packet size with an available number of bytes to store coding coefficients for network coding, and wherein the maximum node pool size is limited to a number of wireless nodes for which the corresponding coding coefficients can be stored in the available number of bytes.

29. A system for transmitting node data in a wireless meshed network, comprising:
   a plurality of wireless nodes configured to transmit and receive node data; each of the plurality of wireless nodes assigned to one of a plurality of node pools;
   at least one consolidating node configured to periodically receive node data from the plurality of wireless nodes,
   wherein each of the plurality of wireless nodes is configured to transmit node data to one or both of other wireless nodes and the at least one consolidating node during assigned time slots;
   wherein the node data for each wireless node includes data originating at the wireless node and wherein each wireless node is configured to receive node data from other wireless nodes of the same node pool and node data from other wireless nodes of a different node pool; and wherein the data originating at the wireless node are linearly aggregated using network coding, only with the node data received from other wireless nodes of the same node pool; and
   wherein each wireless node is configured to transmit node data during its assigned time slots so that the node data transmitted by each wireless node will not interfere with the node data transmitted by any other wireless node in the wireless meshed network.

30. A system for transmitting node data in a wireless meshed network, comprising:
   a plurality of wireless nodes configured to transmit and receive node data; wherein each of the plurality of wireless nodes is assigned to one of a plurality of node pools and wherein the wireless nodes in each node pool is configured to transmit node data at a different frequency than the wireless nodes in an adjacent node pool;
   at least one consolidating node configured to periodically receive node data from each of the plurality of wireless nodes,
   wherein each of the plurality of wireless nodes is configured to transmit node data to one or both of other wireless nodes and the at least one consolidating node during assigned time slots, wherein each wireless node is configured to transmit its node data during timeslots which are adjacent to timeslots during which a wireless node from another node pool transmits its node data; and
   wherein the node data for each wireless node includes data originating at the wireless node and wherein each wireless node is configured to receive node data from other wireless nodes of the same node pool and node data from other wireless nodes of a different node pool; and
   wherein the data originating at the wireless node are linearly aggregated using network coding, only with the node data received from other wireless nodes of the same node pool.

* * * * *